US009346496B2

(12) United States Patent
Breidenbach

(10) Patent No.: US 9,346,496 B2
(45) Date of Patent: May 24, 2016

(54) AERODYNAMIC DRAG REDUCING APPARATUS

(71) Applicant: Advanced Transit Dynamics, Inc., Hayward, CA (US)

(72) Inventor: Thomas Scott Breidenbach, Maple Grove, MN (US)

(73) Assignee: STEMCO LP, Charlotte, NC (US)

( * ) Notice: Subject to any disclaimer, the term of this patent is extended or adjusted under 35 U.S.C. 154(b) by 0 days.

(21) Appl. No.: 14/531,989

(22) Filed: Nov. 3, 2014

(65) Prior Publication Data

US 2015/0266520 A1    Sep. 24, 2015

Related U.S. Application Data

(63) Continuation of application No. 13/937,171, filed on Jul. 8, 2013, now Pat. No. 8,876,191, which is a continuation of application No. 13/625,569, filed on Sep. 24, 2012, now Pat. No. 8,480,162, which is a continuation of application No. 13/272,743, filed on Oct. 13, 2011, now Pat. No. 8,272,680, which is a continuation of application No. 12/967,758, filed on Dec. 14, 2010, now abandoned, which is a continuation of application No. 12/618,322, filed on Nov. 13, 2009, now Pat. No. 7,850,224, which is a continuation of application No. 12/045,022, filed on Mar. 9, 2008, now Pat. No. 7,618,086, which is a continuation-in-part of application No. 11/565,254, filed on Nov. 30, 2006, now Pat. No. 7,374,230.

(60) Provisional application No. 60/741,155, filed on Dec. 1, 2005.

(51) Int. Cl.
*B62D 37/00* (2006.01)
*B62D 35/00* (2006.01)

(52) U.S. Cl.
CPC ................................. *B62D 35/001* (2013.01)

(58) Field of Classification Search
CPC ............................. B62D 35/00; B62D 35/001
See application file for complete search history.

(56) References Cited

U.S. PATENT DOCUMENTS

| 227,401 A | 5/1880 | Wood |
|---|---|---|
| 609,789 A | 8/1898 | Capewell |
| 797,077 A | 8/1905 | Angus et al. |
| 891,537 A | 6/1908 | Graff |
| 1,352,679 A | 9/1920 | Myers |

(Continued)

FOREIGN PATENT DOCUMENTS

| CA | 2315339 A1 | 2/2001 |
|---|---|---|
| DE | 2911084 A1 | 9/1980 |

(Continued)

OTHER PUBLICATIONS

Roush, "U.S. Appl. No. 60/927,614, Aerodynamic Trailer With Sliding Rear Door", May 4, 2007, Published in: US.

(Continued)

*Primary Examiner* — Lori L Lyjak
(74) *Attorney, Agent, or Firm* — Perkins Coie LLP

(57) ABSTRACT

An aerodynamic drag reducing apparatus for use with vehicles having downstream surfaces that are not streamlined. The apparatus includes folding panels that extend rearward for use in a drag reducing configuration and collapse for use in a space saving configuration.

19 Claims, 28 Drawing Sheets

(56) References Cited

U.S. PATENT DOCUMENTS

| | | |
|---|---|---|
| 1,364,053 A | 12/1920 | Quintin |
| 1,390,793 A | 9/1921 | Kyle et al. |
| 1,517,365 A | 12/1924 | Kleine |
| 1,543,877 A | 6/1925 | Saunders |
| 1,584,275 A | 5/1926 | Chalkley |
| 1,714,609 A | 5/1929 | Massey |
| 1,871,390 A | 8/1932 | Reynolds |
| 1,871,396 A | 8/1932 | Stalker |
| 1,875,276 A | 8/1932 | Steigert |
| 1,879,594 A | 9/1932 | Trey |
| 1,912,138 A | 5/1933 | Hoover |
| 1,913,169 A | 6/1933 | Martin |
| 2,037,942 A | 4/1936 | Stalker |
| 2,199,883 A | 5/1940 | Ishiwata |
| 2,208,075 A | 7/1940 | Jabelmann |
| 2,237,141 A | 4/1941 | Gale |
| 2,338,533 A | 1/1944 | Pash |
| 2,344,515 A | 3/1944 | Massey |
| 2,547,528 A | 4/1951 | Lewis |
| 2,569,354 A | 9/1951 | Tracy |
| 2,569,983 A | 10/1951 | Favre |
| 2,737,411 A | 3/1956 | Potter |
| 2,772,624 A | 12/1956 | Carnes |
| 2,780,980 A | 2/1957 | Kennedy |
| 2,887,243 A | 5/1959 | Murdock, Sr. |
| 2,933,344 A | 4/1960 | Shumaker |
| 2,938,680 A | 5/1960 | Greene et al. |
| 2,964,352 A | 12/1960 | Werner |
| 3,010,754 A | 11/1961 | Shumaker et al. |
| 3,016,700 A | 1/1962 | Howald |
| 3,053,351 A | 9/1962 | Fulcher |
| 3,074,079 A | 1/1963 | Isaacson |
| 3,112,135 A | 11/1963 | Salomonson |
| 3,178,131 A | 4/1965 | Laing |
| 3,214,215 A | 10/1965 | Hansen |
| 3,276,811 A | 10/1966 | Schmidt |
| 3,342,523 A | 9/1967 | Lutgen |
| 3,346,186 A | 10/1967 | Fulton et al. |
| 3,415,566 A | 12/1968 | Kerrigan |
| 3,425,740 A | 2/1969 | Vaughn |
| 3,455,594 A | 7/1969 | Mrlik et al. |
| 3,496,687 A | 2/1970 | Greenberg et al. |
| 3,526,365 A | 9/1970 | Darrow, Jr. |
| 3,711,146 A | 1/1973 | Madzsar et al. |
| 3,743,343 A | 7/1973 | Grote et al. |
| 3,791,468 A | 2/1974 | Bryan et al. |
| 3,807,787 A | 4/1974 | Gotz |
| 3,834,752 A | 9/1974 | Freidenfeld et al. |
| 3,934,922 A | 1/1976 | MacCready et al. |
| 3,941,334 A | 3/1976 | Cole |
| 3,951,445 A | 4/1976 | Tatom et al. |
| 3,960,402 A | 6/1976 | Keck |
| 3,971,586 A | 7/1976 | Saunders |
| 3,977,716 A | 8/1976 | Whited et al. |
| 3,994,451 A | 11/1976 | Cole |
| 3,994,452 A | 11/1976 | Cole |
| 3,999,797 A | 12/1976 | Kirsch et al. |
| 4,006,932 A | 2/1977 | McDonald et al. |
| 4,021,069 A | 5/1977 | Hersh et al. |
| 4,035,013 A | 7/1977 | Abbott et al. |
| 4,053,124 A | 10/1977 | Cole |
| 4,113,299 A | 9/1978 | Johnson et al. |
| 4,117,900 A | 10/1978 | Amick |
| 4,126,974 A | 11/1978 | Hardin |
| 4,142,755 A | 3/1979 | Keedy |
| 4,154,149 A | 5/1979 | Holford |
| 4,174,863 A | 11/1979 | Gotz et al. |
| 4,210,354 A | 7/1980 | Canning |
| 4,214,787 A | 7/1980 | Chain |
| 4,236,745 A | 12/1980 | Davis |
| 4,248,103 A | 2/1981 | Halsall |
| 4,257,641 A | 3/1981 | Keedy |
| 4,269,444 A | 5/1981 | Emory et al. |
| 4,316,630 A | 2/1982 | Evans et al. |
| 4,320,920 A | 3/1982 | Goudey et al. |
| 4,349,155 A | 9/1982 | Donguy |
| 4,357,045 A | 11/1982 | Kinford et al. |
| 4,375,898 A | 3/1983 | Stephens et al. |
| 4,379,582 A | 4/1983 | Miwa et al. |
| 4,383,407 A | 5/1983 | Inman |
| 4,384,630 A | 5/1983 | Steiner et al. |
| 4,386,801 A | 6/1983 | Chapman et al. |
| 4,421,354 A | 12/1983 | Lemaster et al. |
| 4,433,865 A | 2/1984 | Crompton, Jr. |
| RE31,565 E | 4/1984 | Beaulieu |
| 4,451,074 A | 5/1984 | Scanlon |
| D274,322 S | 6/1984 | Hayes et al. |
| 4,457,550 A | 7/1984 | Gielow et al. |
| 4,458,936 A | 7/1984 | Mulholland |
| 4,458,937 A | 7/1984 | Beckmann et al. |
| 4,462,628 A | 7/1984 | Gregg |
| 4,486,046 A | 12/1984 | Whitney et al. |
| 4,489,889 A | 12/1984 | Inman |
| 4,508,380 A | 4/1985 | Sankrithi |
| 4,518,188 A | 5/1985 | Witten et al. |
| 4,525,123 A | 6/1985 | Curci |
| 4,601,508 A | 7/1986 | Kerian |
| 4,611,847 A | 9/1986 | Sullivan |
| 4,640,541 A | 2/1987 | FitzGerald et al. |
| 4,653,788 A | 3/1987 | Giusto et al. |
| 4,678,118 A | 7/1987 | Fukami et al. |
| 4,682,808 A | 7/1987 | Bilanin |
| 4,688,841 A | 8/1987 | Moore |
| 4,702,509 A | 10/1987 | Elliott, Sr |
| 4,706,910 A | 11/1987 | Walsh et al. |
| 4,722,500 A | 2/1988 | Bray |
| 4,741,569 A | 5/1988 | Sutphen |
| 4,746,160 A | 5/1988 | Wiesemeyer |
| 4,773,692 A | 9/1988 | Schleicher et al. |
| 4,784,429 A | 11/1988 | Hodges |
| 4,810,022 A | 3/1989 | Takagi et al. |
| 4,818,015 A | 4/1989 | Scanlon |
| 4,944,550 A | 7/1990 | Drown et al. |
| 4,951,994 A | 8/1990 | Miwa et al. |
| 4,976,349 A | 12/1990 | Adkins |
| 4,978,162 A | 12/1990 | Labbe |
| 5,000,508 A | 3/1991 | Woods et al. |
| 5,058,945 A | 10/1991 | Elliott, Sr. et al. |
| 5,108,145 A | 4/1992 | Harris et al. |
| 5,156,195 A | 10/1992 | Wehler et al. |
| 5,190,342 A | 3/1993 | Marlowe et al. |
| 5,199,762 A | 4/1993 | Scheele et al. |
| 5,236,347 A | 8/1993 | Andrus |
| 5,237,887 A | 8/1993 | Appleberry |
| 5,240,306 A | 8/1993 | Flemming |
| 5,280,990 A | 1/1994 | Rinard |
| 5,317,880 A | 6/1994 | Spears et al. |
| 5,332,280 A | 7/1994 | DuPont |
| 5,348,366 A | 9/1994 | Baker et al. |
| 5,375,903 A | 12/1994 | Lechner |
| 5,498,059 A | 3/1996 | Switlik |
| 5,570,924 A | 11/1996 | Few et al. |
| 5,609,384 A | 3/1997 | Loewen |
| 5,823,610 A | 10/1998 | Ryan et al. |
| 5,842,734 A | 12/1998 | Lechner |
| 5,857,648 A | 1/1999 | Dailey et al. |
| 5,908,217 A | 6/1999 | Englar et al. |
| 5,947,548 A | 9/1999 | Carper et al. |
| 6,045,095 A | 4/2000 | Parrish et al. |
| 6,092,861 A | 7/2000 | Whelan |
| 6,170,904 B1 | 1/2001 | Schaedlich et al. |
| 6,205,772 B1 | 3/2001 | Perrier et al. |
| 6,257,654 B1 | 7/2001 | Boivin et al. |
| 6,286,892 B1 | 9/2001 | Baur et al. |
| 6,286,894 B1 | 9/2001 | Kingham |
| 6,309,010 B1 | 10/2001 | Whitten |
| 6,375,126 B1 | 4/2002 | Sakurai et al. |
| 6,382,708 B1 | 5/2002 | Erdelitsch et al. |
| 6,409,252 B1 | 6/2002 | Andrus |
| 6,418,710 B1 | 7/2002 | Perrier et al. |
| 6,457,766 B1 | 10/2002 | Telnack |
| 6,467,833 B1 | 10/2002 | Travers |
| 6,485,087 B1 | 11/2002 | Roberge et al. |
| 6,561,575 B2 | 5/2003 | Fairburn et al. |

(56) References Cited

U.S. PATENT DOCUMENTS

| | | |
|---|---|---|
| 6,565,112 B2 | 5/2003 | Hanson et al. |
| 6,595,578 B1 | 7/2003 | Calsoyas et al. |
| 6,616,218 B2 | 9/2003 | Bauer et al. |
| 6,644,720 B2 | 11/2003 | Long et al. |
| 6,666,498 B1 | 12/2003 | Whitten |
| 6,669,270 B1 | 12/2003 | Card et al. |
| 6,742,616 B2 | 6/2004 | Leban et al. |
| 6,779,834 B1 | 8/2004 | Keller |
| 6,789,839 B1 | 9/2004 | Samuelson |
| 6,799,791 B2 | 10/2004 | Reiman et al. |
| 6,846,035 B2 | 1/2005 | Wong et al. |
| 6,854,788 B1 | 2/2005 | Graham |
| 6,877,793 B2 | 4/2005 | Cory |
| 6,886,882 B2 | 5/2005 | Farlow et al. |
| 6,915,611 B2 | 7/2005 | Reiman et al. |
| 6,959,958 B2 | 11/2005 | Basford et al. |
| 6,974,178 B2 | 12/2005 | Ortega et al. |
| 7,008,004 B2 | 3/2006 | Ortega et al. |
| 7,008,005 B1 | 3/2006 | Graham et al. |
| 7,118,164 B2 | 10/2006 | Frank et al. |
| 7,147,270 B1 | 12/2006 | Andrus et al. |
| 7,192,077 B1 | 3/2007 | Hilleman et al. |
| 7,207,620 B2 | 4/2007 | Cosgrove et al. |
| 7,240,958 B2 | 7/2007 | Skopic et al. |
| 7,243,980 B2 | 7/2007 | Vala |
| 7,374,229 B1 | 5/2008 | Noll et al. |
| 7,374,230 B2 | 5/2008 | Breidenbach et al. |
| 7,380,868 B2 | 6/2008 | Breidenbach et al. |
| 7,404,592 B2 | 7/2008 | Reiman et al. |
| 7,484,791 B1 | 2/2009 | Chen et al. |
| 7,549,695 B2 | 6/2009 | Royer et al. |
| 7,578,541 B2 | 8/2009 | Layfield et al. |
| 7,618,086 B2 | 11/2009 | Breidenbach et al. |
| 7,625,034 B1 | 12/2009 | Fitzgerald et al. |
| 7,641,262 B2 | 1/2010 | Nusbaum et al. |
| 7,740,304 B1 | 6/2010 | Breu et al. |
| 7,748,771 B2 | 7/2010 | Distel et al. |
| 7,780,224 B2 | 8/2010 | Roush et al. |
| 7,789,412 B2 | 9/2010 | Algüera et al. |
| 7,789,453 B2 | 9/2010 | Roush et al. |
| 7,794,011 B2 | 9/2010 | Kjellgren et al. |
| 7,806,464 B2 | 10/2010 | Cardolle et al. |
| 7,850,224 B2 | 12/2010 | Breidenbach et al. |
| 7,854,468 B2 | 12/2010 | Vogel et al. |
| 7,862,102 B1 | 1/2011 | Benton et al. |
| 7,950,720 B2 | 5/2011 | Skopic et al. |
| 7,992,923 B2 | 8/2011 | Dayton et al. |
| 8,079,634 B2 | 12/2011 | Visser et al. |
| 8,100,461 B2 | 1/2012 | Smith et al. |
| 8,251,436 B2 | 8/2012 | Henderson et al. |
| 8,360,509 B2 | 1/2013 | Grossmann et al. |
| 8,608,228 B2 | 12/2013 | Visentin et al. |
| 9,126,638 B2 | 9/2015 | Thomas |
| 9,145,177 B2 | 9/2015 | Smith et al. |
| 9,180,919 B2 | 11/2015 | Thomas |
| 2002/0005655 A1 | 1/2002 | Bauer et al. |
| 2002/0021023 A1 | 2/2002 | Leban et al. |
| 2002/0030384 A1 | 3/2002 | Basford et al. |
| 2003/0057736 A1 | 3/2003 | Long et al. |
| 2003/0205913 A1 | 11/2003 | Leonard et al. |
| 2004/0118055 A1 | 6/2004 | Reiman et al. |
| 2004/0119319 A1 | 6/2004 | Reiman et al. |
| 2004/0256885 A1 | 12/2004 | Bui et al. |
| 2005/0040637 A1 | 2/2005 | Wood et al. |
| 2005/0146161 A1 | 7/2005 | Uland et al. |
| 2005/0159075 A1 | 7/2005 | Isobe et al. |
| 2005/0204681 A1 | 9/2005 | Zeigler et al. |
| 2006/0157623 A1 | 7/2006 | Voglsinger et al. |
| 2006/0252361 A1 | 11/2006 | Henderson et al. |
| 2006/0273625 A1 | 12/2006 | Andrus et al. |
| 2007/0001481 A1 | 1/2007 | Breidenbach et al. |
| 2007/0120397 A1 | 5/2007 | Layfield et al. |
| 2007/0126261 A1 | 6/2007 | Breidenbach et al. |
| 2007/0200390 A1 | 8/2007 | Lotarev et al. |
| 2007/0228772 A1 | 10/2007 | Froeschle et al. |
| 2007/0246969 A1 | 10/2007 | Smith et al. |
| 2008/0048468 A1 | 2/2008 | Holubar et al. |
| 2008/0061597 A1 | 3/2008 | Reiman et al. |
| 2008/0061598 A1 | 3/2008 | Reiman et al. |
| 2008/0093886 A1 | 4/2008 | Nusbaum et al. |
| 2008/0217957 A1 | 9/2008 | Schoon et al. |
| 2008/0272617 A1 | 11/2008 | Roush et al. |
| 2008/0290686 A1 | 11/2008 | Royer et al. |
| 2008/0303310 A1 | 12/2008 | Breidenbach et al. |
| 2008/0309122 A1 | 12/2008 | Smith et al. |
| 2009/0096250 A1 | 4/2009 | Kohls et al. |
| 2009/0140542 A1 | 6/2009 | Breidenbach et al. |
| 2009/0146453 A1 | 6/2009 | Ortega et al. |
| 2009/0179456 A1 | 7/2009 | Holubar et al. |
| 2009/0200834 A1 | 8/2009 | Vogel et al. |
| 2009/0212594 A1 | 8/2009 | Breidenbach et al. |
| 2009/0212595 A1 | 8/2009 | Heppel et al. |
| 2009/0212596 A1 | 8/2009 | Reiman et al. |
| 2009/0230726 A1 | 9/2009 | Reiman et al. |
| 2009/0236872 A1 | 9/2009 | Wood et al. |
| 2010/0066123 A1 | 3/2010 | Ortega et al. |
| 2010/0106380 A1 | 4/2010 | Salari et al. |
| 2010/0164249 A1 | 7/2010 | Nusbaum et al. |
| 2010/0201153 A1 | 8/2010 | Pesotini et al. |
| 2010/0222671 A1 | 9/2010 | Cohen et al. |
| 2010/0225143 A1 | 9/2010 | Skopic et al. |
| 2011/0037291 A1 | 2/2011 | Pickering et al. |
| 2011/0068605 A1 | 3/2011 | Domo et al. |
| 2011/0084516 A1 | 4/2011 | Smith et al. |
| 2011/0084517 A1 | 4/2011 | Vogel et al. |
| 2011/0095564 A1 | 4/2011 | Chen et al. |
| 2011/0095565 A1 | 4/2011 | Chen et al. |
| 2011/0095566 A1 | 4/2011 | Chen et al. |
| 2011/0115254 A1 | 5/2011 | Skopic et al. |
| 2012/0086233 A1 | 4/2012 | Visser et al. |
| 2012/0104792 A1 | 5/2012 | Smith et al. |
| 2012/0223544 A1 | 9/2012 | Benton et al. |
| 2012/0235441 A1 | 9/2012 | Dayton et al. |
| 2013/0076064 A1 | 3/2013 | Smith et al. |
| 2013/0106136 A1 | 5/2013 | Smith et al. |
| 2013/0175824 A1 | 7/2013 | Smith et al. |
| 2013/0249241 A1 | 9/2013 | Baker et al. |
| 2014/0117713 A1 | 5/2014 | Baker et al. |
| 2014/0217775 A1 | 8/2014 | Breidenbach et al. |
| 2014/0319870 A1 | 10/2014 | Breidenbach et al. |
| 2014/0346807 A1 | 11/2014 | Breidenbach |
| 2015/0266520 A1 | 9/2015 | Thomas |

FOREIGN PATENT DOCUMENTS

| | | |
|---|---|---|
| DE | 2922130 A1 | 12/1980 |
| DE | 19524825 A1 | 1/1997 |
| DE | 19640965 A1 | 4/1997 |
| DE | 29705882 U1 | 7/1997 |
| DE | 29623407 U1 | 7/1998 |
| DE | 10228658 A1 | 1/2004 |
| DE | 10240504 A1 | 3/2004 |
| DE | 10316105 A1 | 10/2004 |
| EP | 1870321 A1 | 12/2007 |
| FR | 2623155 A1 | 5/1989 |
| JP | 06016157 A | 1/1994 |
| WO | 2007079306 A2 | 7/2007 |
| WO | 2008024386 A2 | 2/2008 |
| WO | 2008124573 A1 | 10/2008 |
| WO | 2008144025 A3 | 1/2009 |
| WO | 2014011886 A1 | 1/2014 |

OTHER PUBLICATIONS

Smith, et al, "U.S. Appl. No. 60/938,697, Rear-Mounted Aerodynamic Structure for Truck Cargo Bodies", May 17, 2007, Published in: US.

Smith, et al, "U.S. Appl. No. 61/039,411, Rear-Mounted Aerodynamic Structure for Truck Cargo Bodies", Mar. 25, 2008, Published in: US.

Telnack, et al., "U.S. Appl. No. 61/065,490, Self-Deploying Drag Reducing Device", Feb. 12, 2008, Published in: US.

(56) References Cited

OTHER PUBLICATIONS

Roush, "U.S. Appl. No. 61/070,669, Rounded Cargo Doors for Trailers and Trucks", Mar. 25, 2008, Published in: US.

Roush, "U.S. Appl. No. 61/070,670, Drag-Reduction Arrangement for Cargo Trucks and Trailers", Mar. 25, 2008, Published in: US.

Ken Visser, "Drag Reduction of Tractor Trailers", Clarkson University, Nov. 2005, 4 pages.

McCallen, et al., "Progress in Reducing Aerodynamic Drag for Higher Efficiency of Heavy Duty Trucks (Class 7-8)", Lawrence Livermore National Laboratory, Apr. 1999, 14 pages.

Ortega, et al., "An Experimental Study of Drag Reduction Devices for a Trailer Underbody and Base", Lawrence Livermore National Laboratory, Jun. 4, 2004, 17 pages.

Randal Scott Funderburk, "An Investigation of a Drag Reducing Device for Tractor-Trailers", A Thesis in Mechanical Engineering, Submitted to the Graduate Faculty of Texas Tech University in Partial Fulfillment of the Requirements for the Degree of Master of Science in Mechanical Engineering, May 1996, 128 pages.

Randall L. Peterson, "Drag Reduction Obtained by the Addition of a Boattail to a Box Shaped Vehicle", NASA Contractor Report 163113, Aug. 1981, 32 pages.

Salari, "Heavy Vehicle Drag Reduction Devices: Computational Evaluation & Design", DOE Heavy Vehicle Systems Review, Apr. 2006, 24 pages.

U.S. Department of Energy, "Heavy Vehicle Systems Optimization", FreedomCAR and Vehicle Technologies Program, 2004 Annual Progress Report, Feb. 2005, 206 pages.

Notification of Transmittal of the International Search Report and the Written Opinion of the International Searching Authority, or the Declaration relating to PCT Application No. PCT/US06/24642 (Jul. 27, 2007).

Machine translation of DE19524825 printed from the internet Nov. 3, 2010.

International Search Report and Written Opinion of the International Searching Authority of the United States Patent Office for PCT/US12/62237, mailed Jan. 15, 2013. 8 pages.

International Search Report and Written Opinion of the International Searching Authority of the European Patent Office for PCT/US2011/055758, mailed Mar. 2, 2012. 13 pages.

International Search Report and Written Opinion of the International Searching Authority of the European Patent Office for PCT/US2013/050083, mailed Oct. 24, 2013. 9 pages.

International Search Report and Written Opinion of the International Searching Authority of the European Patent Office for PCT/US2008/006374, mailed Nov. 14, 2008. 14 pages.

International Search Report and Written Opinion of the International Searching Authority of the European Patent Office for PCT/US2012/056365, mailed Feb. 27, 2013. 10 pages.

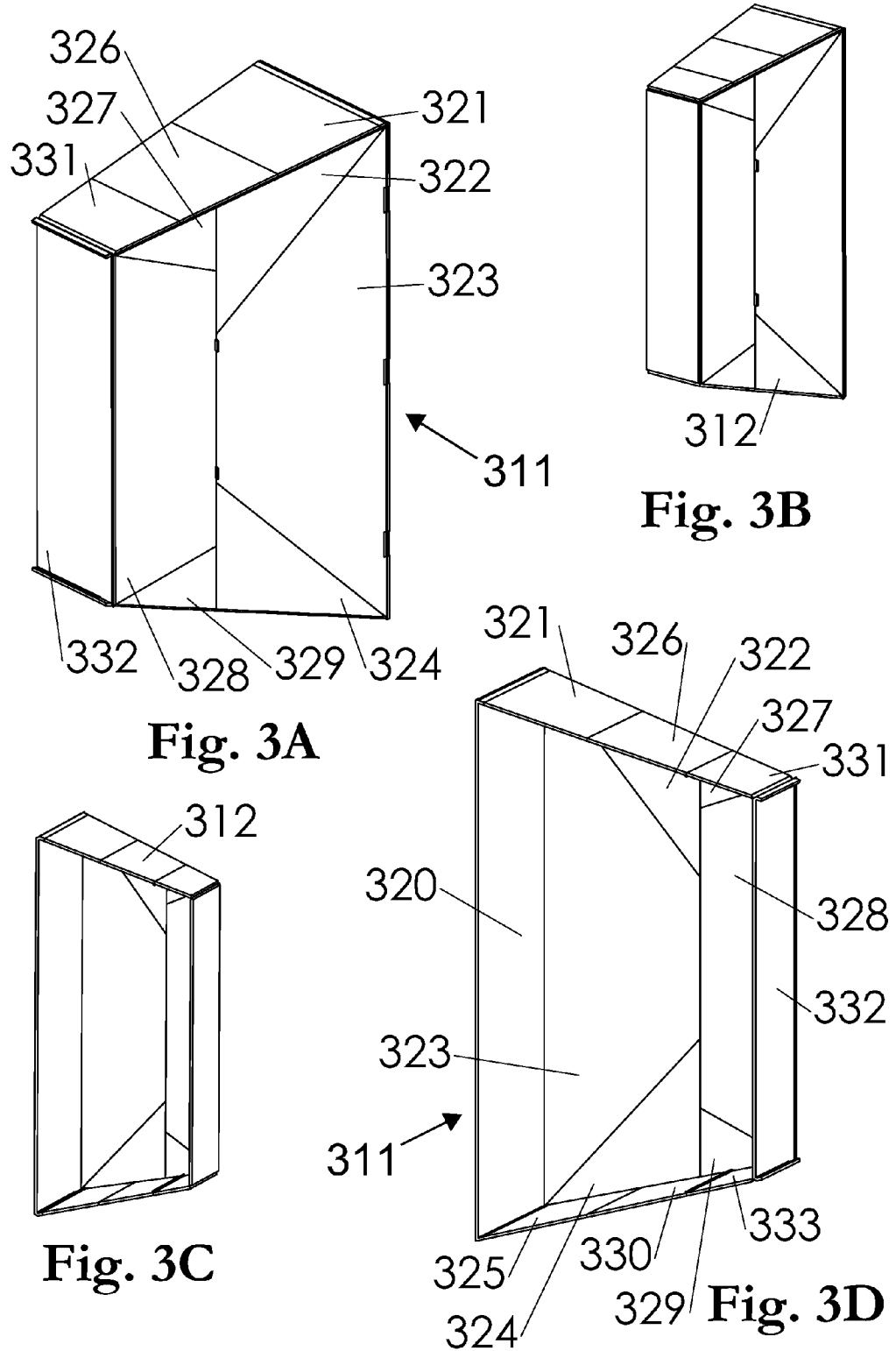

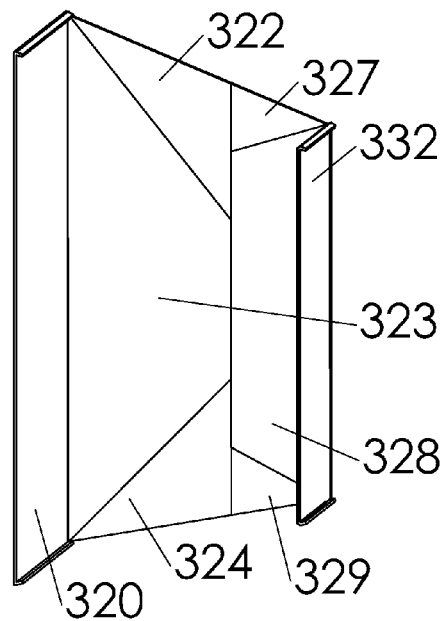
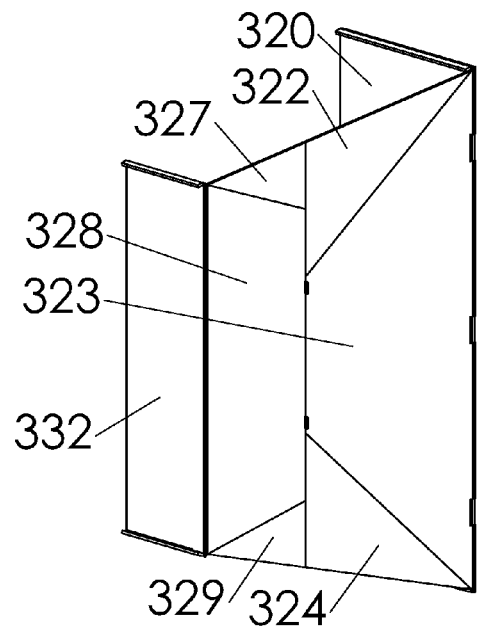
Fig. 6A  Fig. 6B
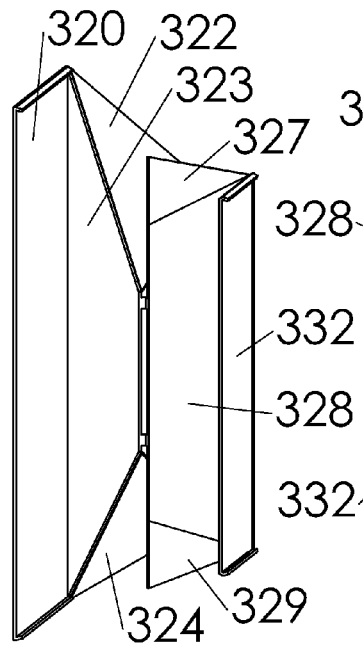
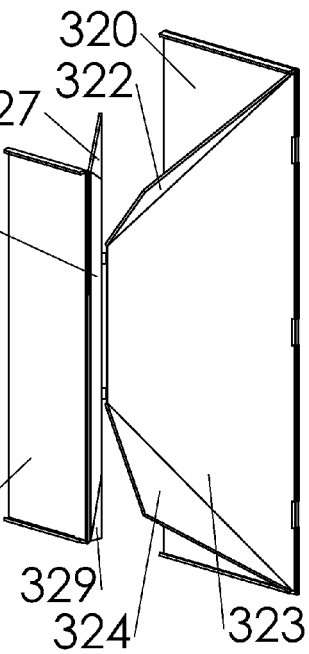
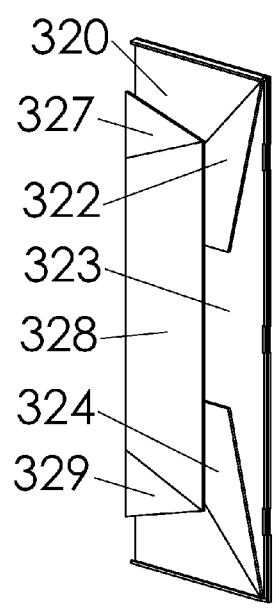
Fig. 6C  Fig. 6D  Fig. 7

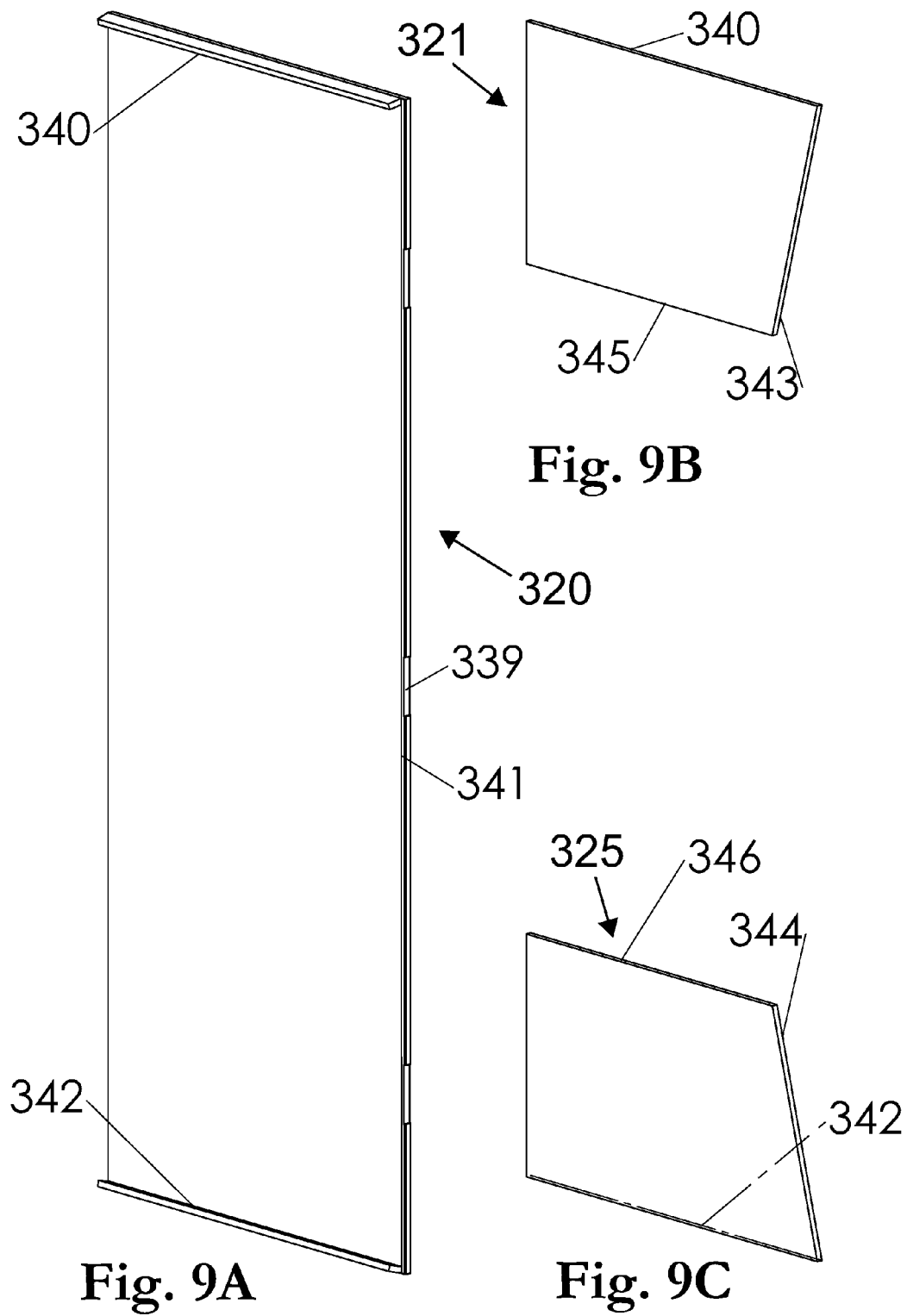

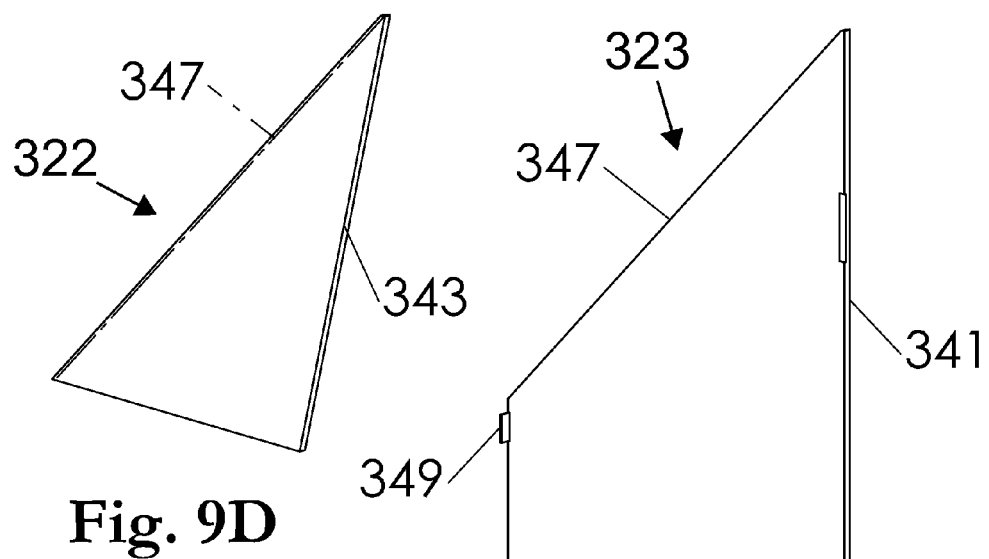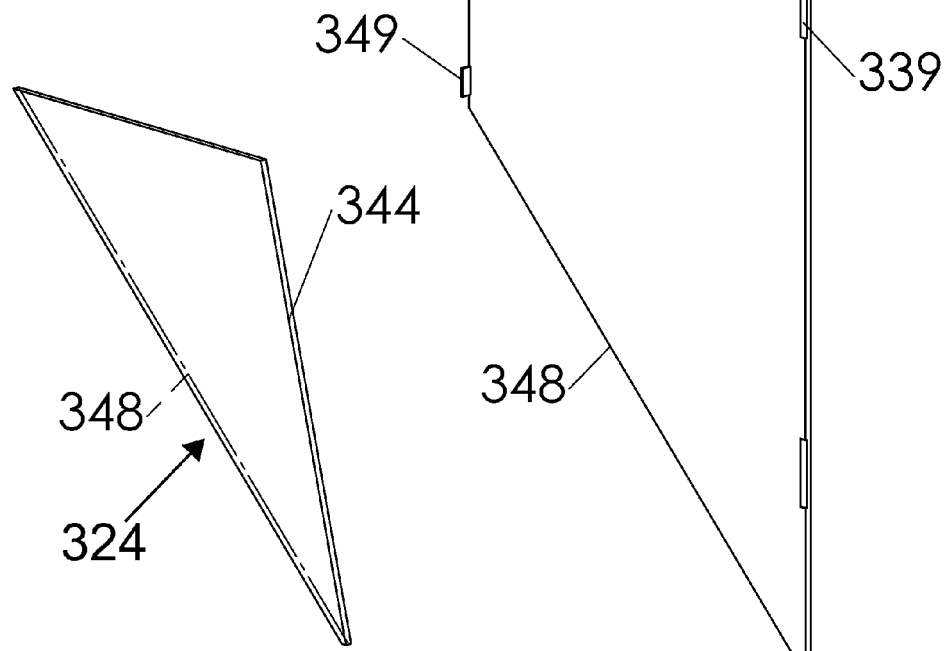
Fig. 9D
Fig. 9E
Fig. 9F

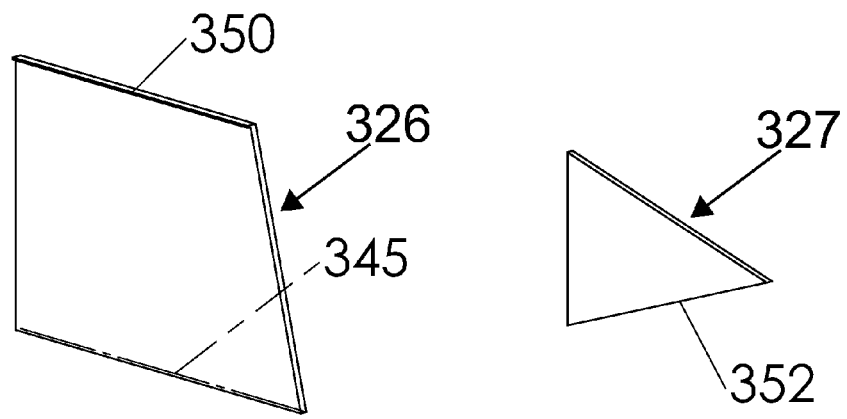
Fig. 9G
Fig. 9I
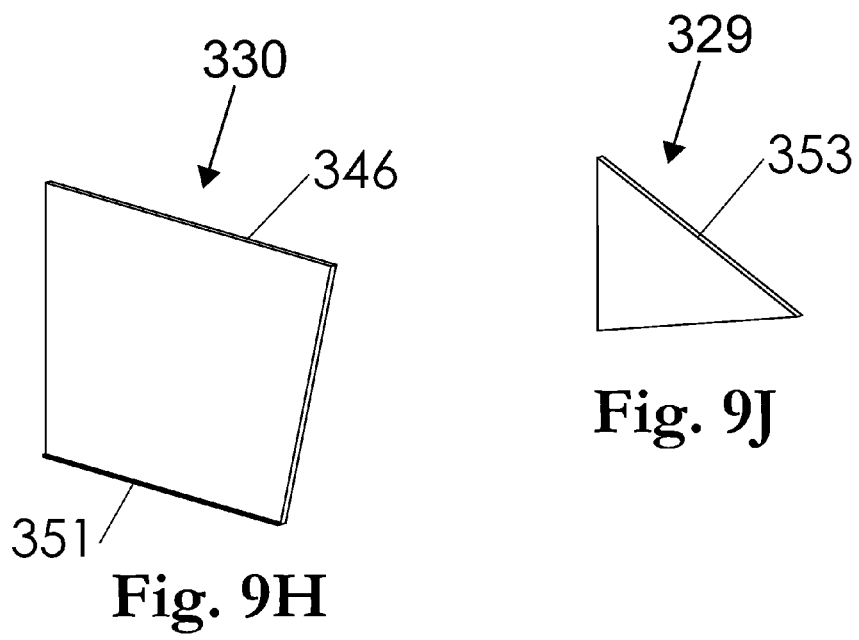
Fig. 9H
Fig. 9J

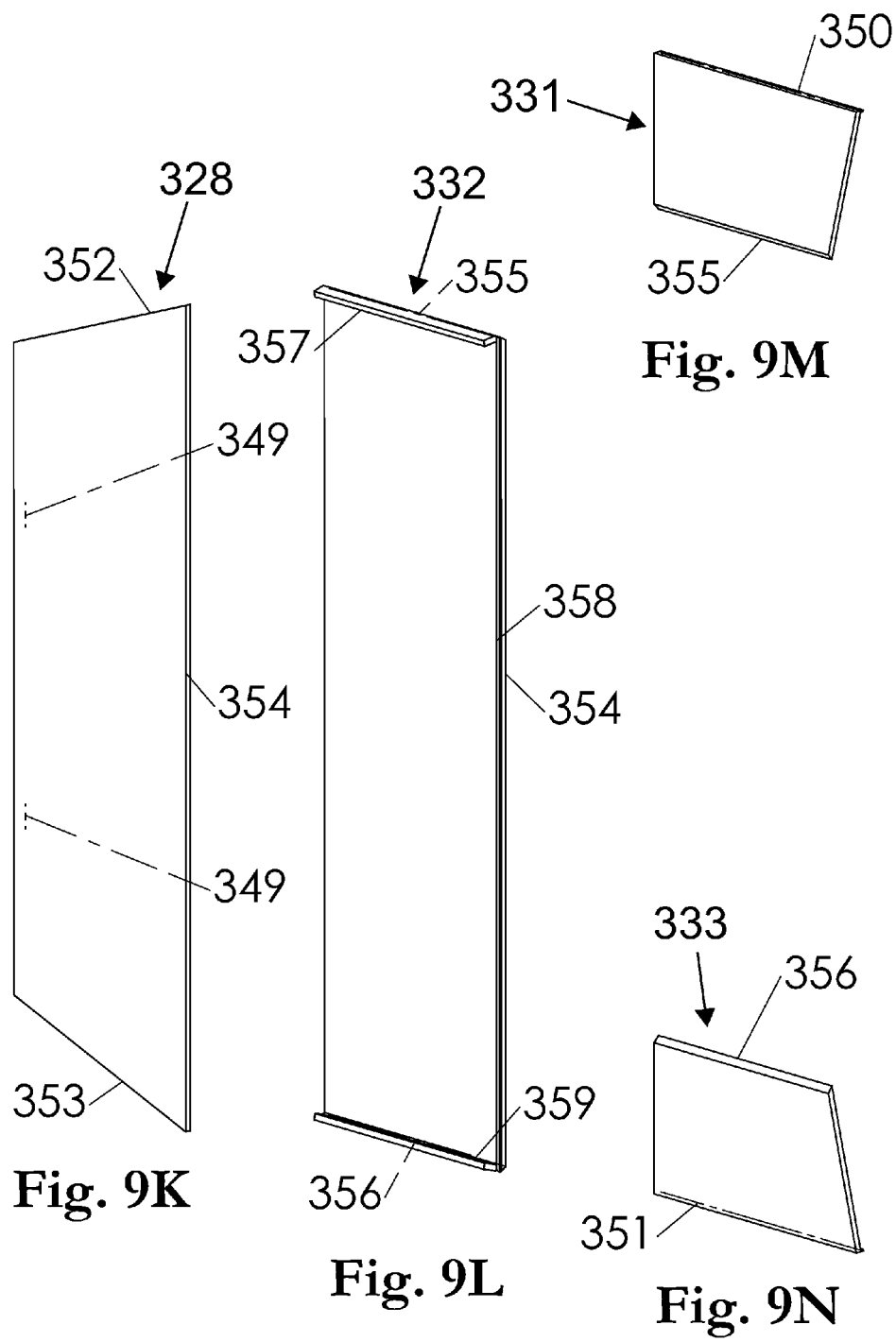

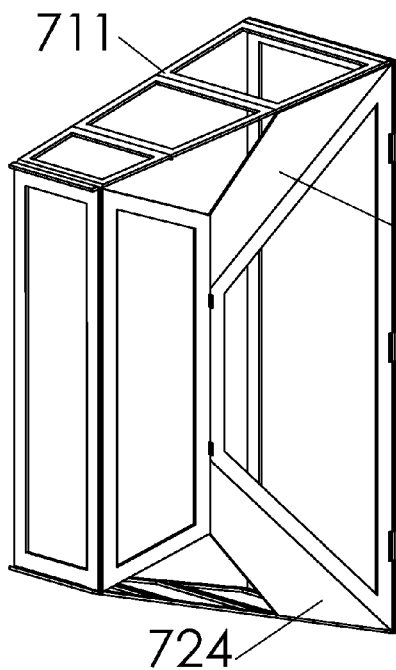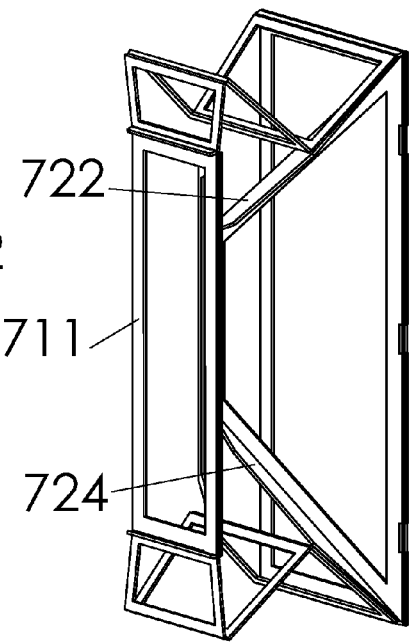
Fig. 14A  Fig. 14B
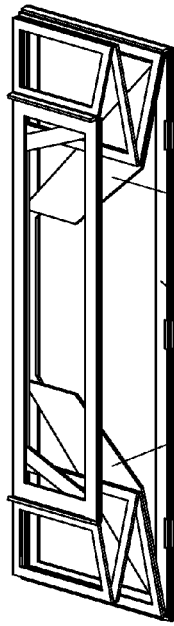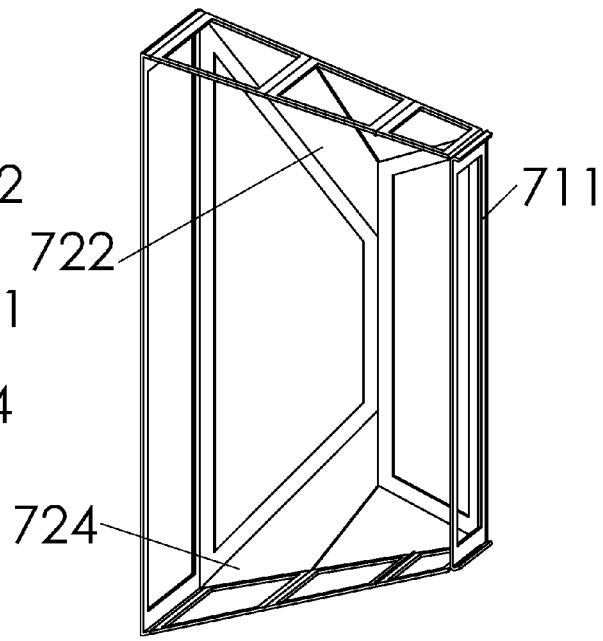
Fig. 14C  Fig. 14D

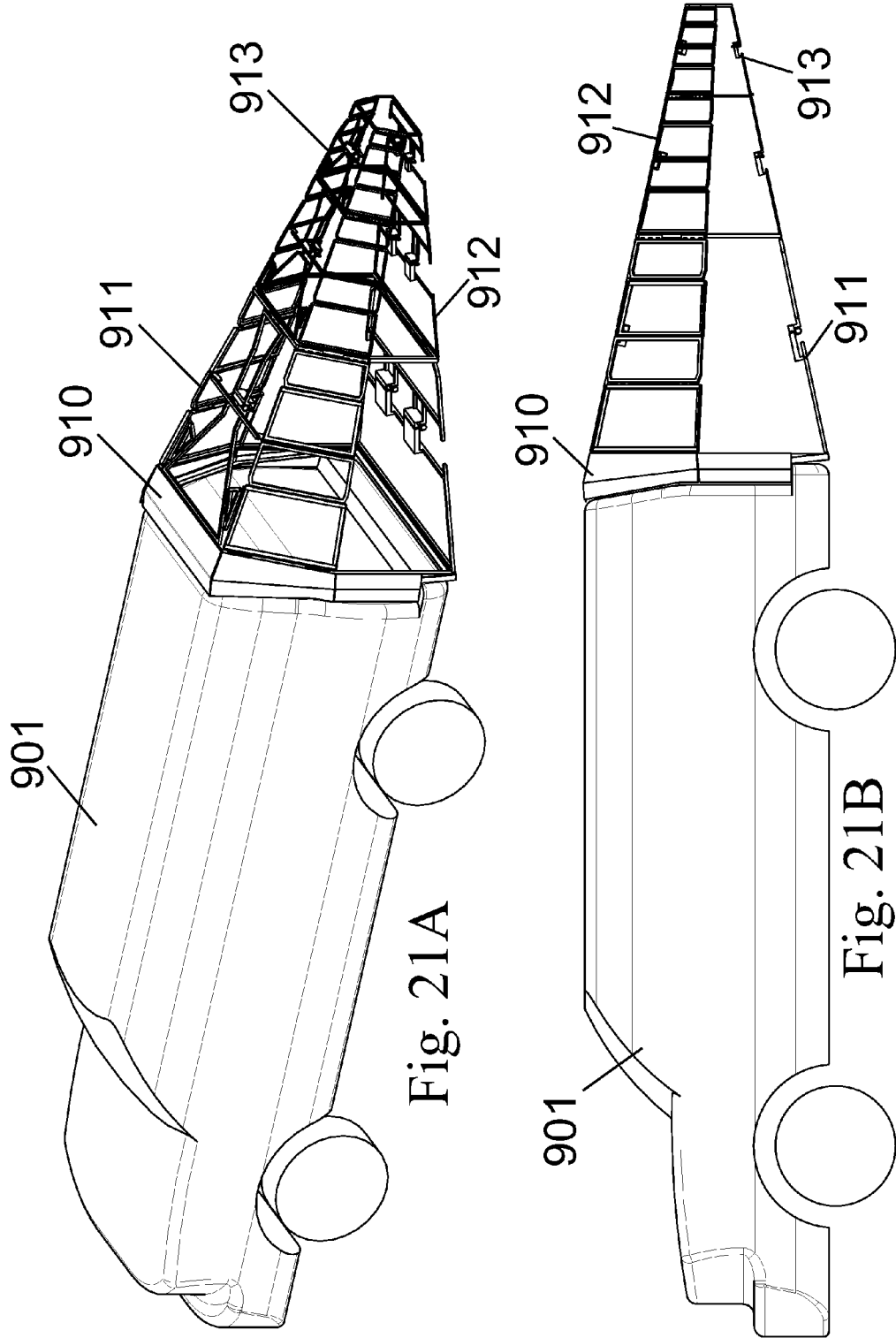

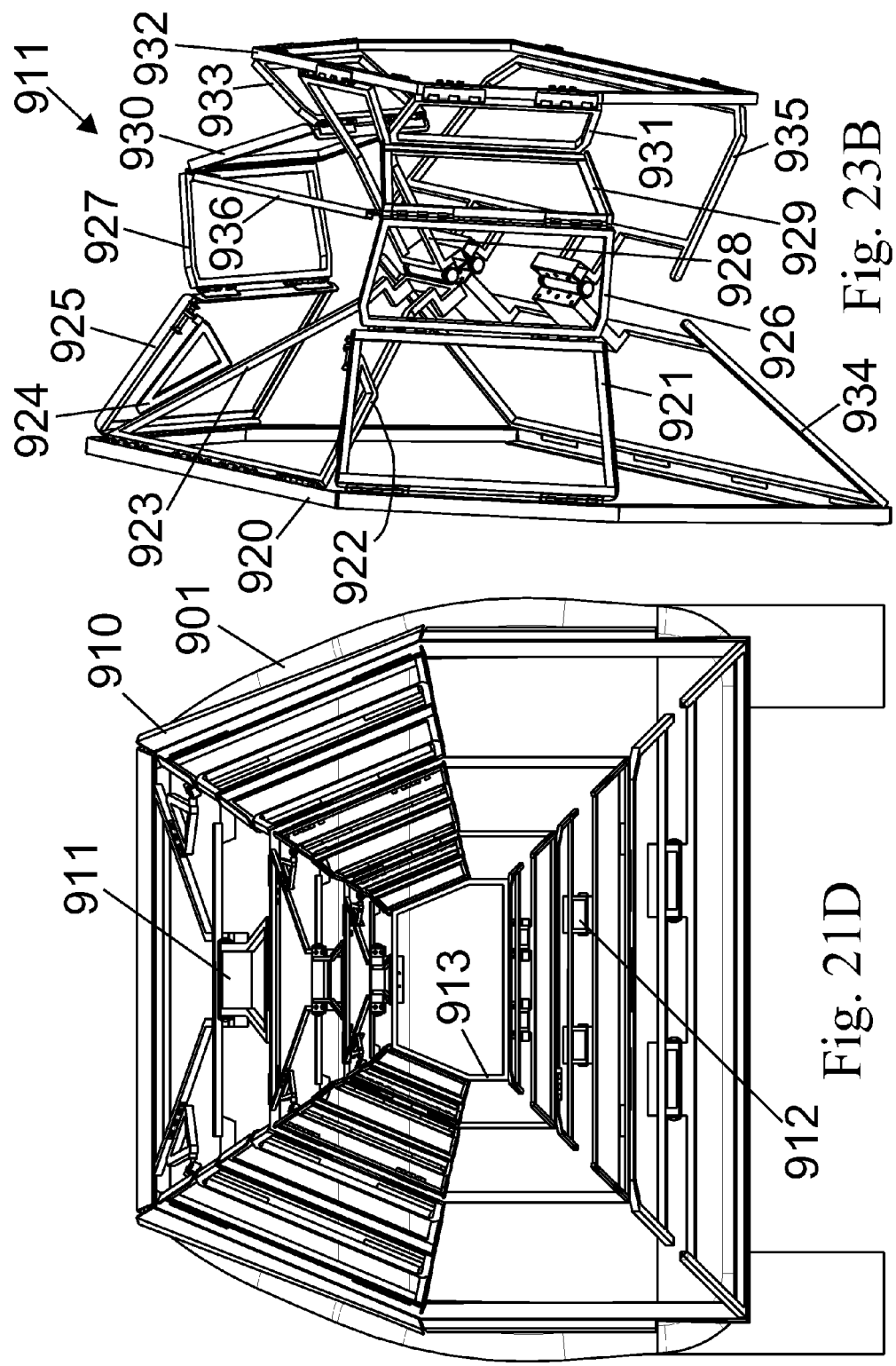

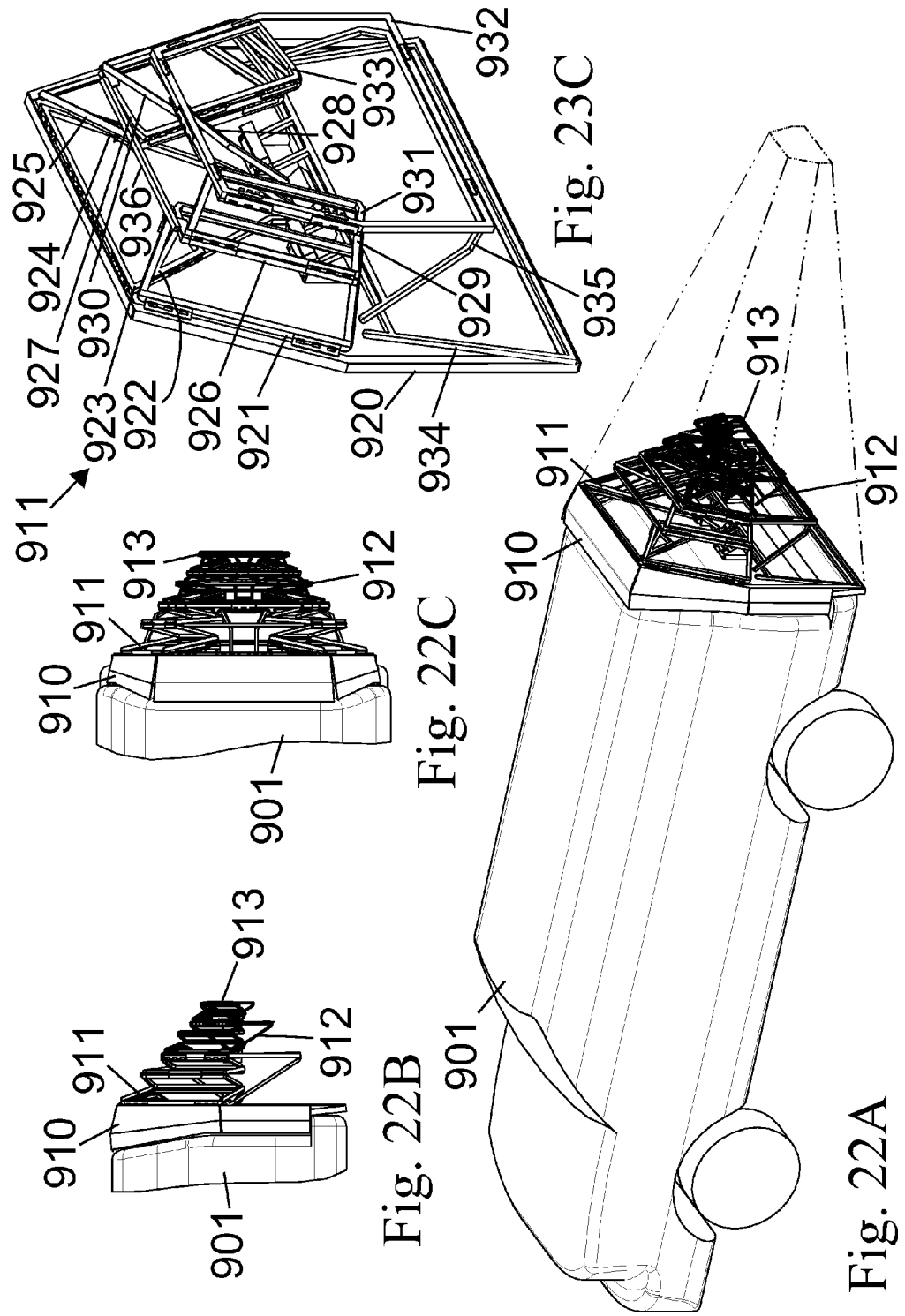

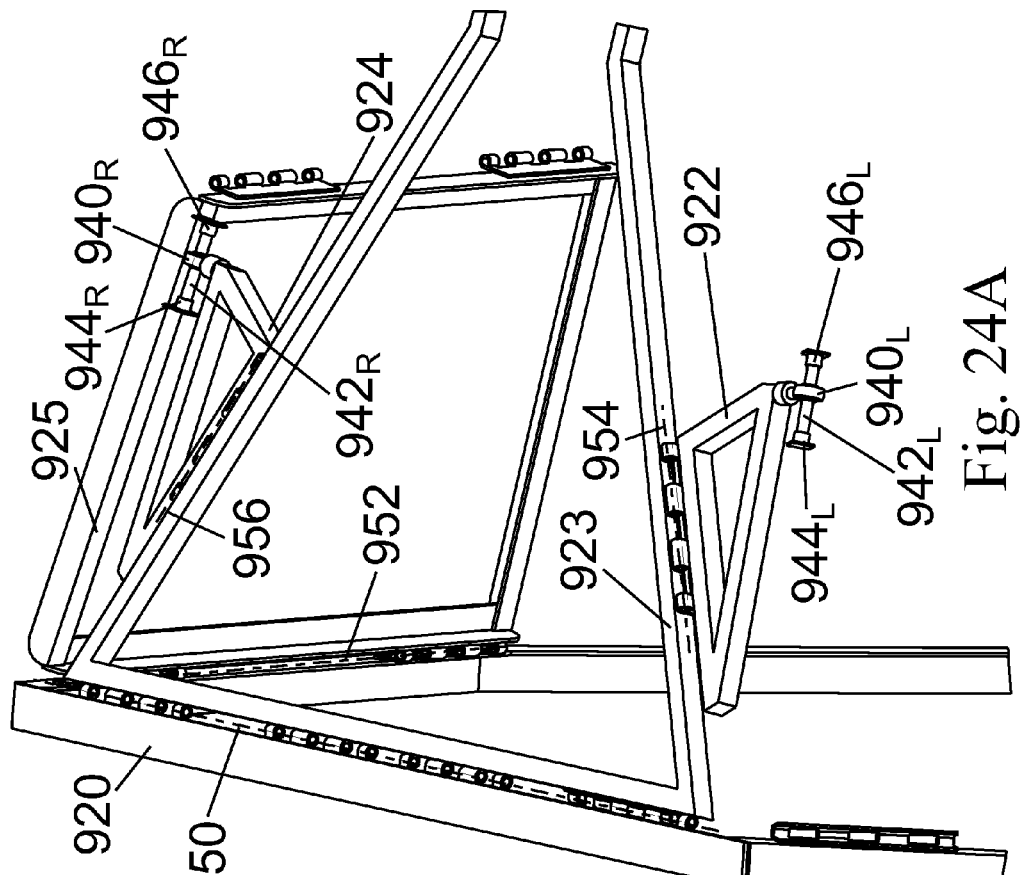
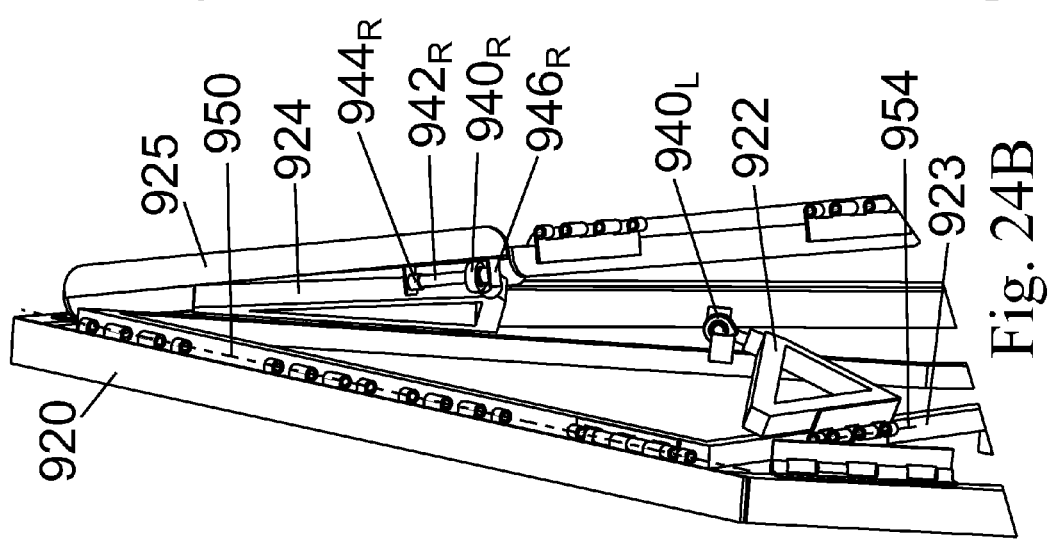

AERODYNAMIC DRAG REDUCING APPARATUS

CROSS REFERENCE TO RELATED APPLICATIONS

This application is a continuation of application Ser. No. 13/937,171, filed Jul. 8, 2013, now U.S. Pat. No. 8,876,191, which is a continuation of application Ser. No. 13/625,569, filed Sep. 24, 2012, now U.S. Pat. No. 8,480,162, which is a continuation of application Ser. No. 13/272,743, filed Oct. 13, 2011, now U.S. Pat. No. 8,272,680, which is a continuation of application Ser. No. 12/967,758, filed Dec. 14, 2010, now abandoned, which is a continuation of application Ser. No. 12/618,322, filed Nov. 13, 2009, now U.S. Pat. No. 7,850,224, which is a continuation of application Ser. No. 12/045,022, filed Mar. 9, 2008, now U.S. Pat. No. 7,618,086, which is a continuation-in-part of application Ser. No. 11/565,254, filed Nov. 30, 2006, now U.S. Pat. No. 7,374,230, which claims the benefit of provisional application Ser. No. 60/741,155, filed Dec. 1, 2005, which applications are incorporated herein by reference in their entirety.

TECHNICAL FIELD

The present invention relates to an aerodynamic drag reducing apparatus for use with vehicles having downstream surfaces that are not streamlined. Examples include: over-the-road trucks and truck trailers, vans and minivans, motor homes and travel trailers, and pickup trucks. In vehicles such as pickup trucks, one non-streamlined surface is near the center of the vehicle. The present invention is suitable for use with vehicles having rear doors.

BACKGROUND

It is known that a significant amount of aerodynamic drag is created when a vehicle travels at velocities typical on a modern roadway. This is due, in large part, to areas of low pressure that are induced on rear surfaces of the vehicle. The low pressure becomes more pronounced as airflow over the vehicle separates from the vehicle surfaces. The phenomenon of airflow separation is also well known in aircraft wing design and, in this case, causes the wing to stall.

Vehicles having blunt rear ends are especially affected by airflow separation starting at an abrupt transition to a rear-near vertical surface. The low pressure that the airflow separation induces is compounded by a relatively large area on which the low air pressure acts in comparison with more streamlined vehicles.

The low air pressure acting on the rear surfaces of a moving vehicle produces a force that resists forward motion of the vehicle. This force is opposed by the vehicle's engine and requires power that is typically produced by burning fuel. Any reduction in aerodynamic drag results in a reduction in fuel consumption.

In a current era of high fuel prices and increasing environmental consciousness, fuel efficiency improvements are a growing concern. Aerodynamic improvements are especially valuable since they can be combined with other improvements such as engine efficiency and reduced chassis weight. Increasing fuel efficiency also provides the valuable benefit of increasing a vehicle's range of travel between refueling.

The present disclosure employs a technique of adding tapered rear surfaces to a vehicle. A similar streamlining principle is practiced with other vehicles such as high-speed cars and airplanes. It has also been applied to over-the-road trucks where the tapered rear surfaces are collectively known as a "boat-tail".

SUMMARY

The present disclosure is concerned with providing an aerodynamic drag reducing apparatus for vehicles with a purpose of reducing energy consumption. More specifically, this is achieved by adding gently sloping surfaces downstream of rear facing surfaces of the vehicle with a goal of reducing airflow separation and aerodynamic drag. This, in turn, reduces fuel consumption of the vehicle.

On certain vehicles, simply adding the required additional surfaces would result in a substantial increase to the vehicle's length. This length would be acceptable, in many cases, on the open road in uncongested traffic, but would be impractical on crowded urban roadways, in parking lots, in campgrounds, and by loading docks. To address this, the present disclosure has two primary configurations. The first configuration is an extended configuration that reduces drag and fuel consumption, especially at highway speeds. The second configuration is a refracted configuration that provides much less, if any, drag reduction, but results in a more compact vehicle that is practical in crowded areas. This combination of configurations in the same apparatus is especially useful since zones of higher speed traffic are often not congested. These high-speed zones are also where the drag reducing potential is the highest. Likewise, congested areas often have reduced traffic speed with less drag reducing potential, but in these cases, the retracted configuration may be required for maneuvering.

In order to easily and conveniently convert between the refracted configuration and the extended configuration, the present disclosure employs panels that fold as part of an apparatus attached to the roar of the vehicle.

To accommodate vehicles where access to the rear of the vehicle is required, certain embodiments of the present disclosure allow the apparatus to be temporarily moved without removal from the vehicle. In certain embodiments, a single whole apparatus is mounted on a support panel, door, or framework that, in turn, is mounted on a hinge, linkage, or linear slide. Other embodiments of the present disclosure have an overall aerodynamic shape split into two halves. These halves can be mounted on hinges and opened, providing access to the rear of the vehicle. Optionally, the halves can be integrated with rear doors of the vehicle.

BRIEF DESCRIPTION OF THE DRAWINGS

The benefits and advantages of the present disclosure will become more readily apparent to those of ordinary skill in the relevant art after reviewing the following detailed description and accompanying drawings, wherein:

FIGS. 1A through 1F are all views sharing the same perspective from the left rear corner. In particular:

FIG. 1A shows the apparatus in a fully extended configuration with right and left trailer doors closed.

FIG. 1B shows the apparatus in a fully refracted configuration with the trailer doors closed.

FIGS. 1C through 1F are enlarged partial views of the same scale. In particular:

FIG. 1C shows the apparatus in the fully retracted configuration with the trailer doors closed.

FIG. 1D shows the right apparatus half in a fully extended configuration with its trailer door closed and the left apparatus half in a fully retracted configuration with its trailer door open.

FIG. 1E shows the apparatus in the fully retracted configuration with the trailer doors opened.

FIG. 1F shows the apparatus in a partially retracted configuration with the trailer doors closed.

FIGS. 1G through 1I are all enlarged partial left elevation views of the same scale shown with the trailer doors closed. In particular:

FIG. 1G shows the apparatus in the fully extended configuration.

FIG. 1H shows the apparatus in the partially refracted configuration.

FIG. 1I shows the apparatus in the fully retracted configuration.

FIGS. 1J through 1M are all enlarged partial top plan views of the same scale. In particular:

FIG. 1J shows the apparatus in the fully extended configuration with the trailer doors closed.

FIG. 1K shows the apparatus in the partially refracted configuration with the trailer doors closed. The tight apparatus half has its non-vertical panels removed for the purpose of illustration.

FIG. 1L shows the apparatus in the fully refracted configuration with the trailer doors closed.

FIG. 1M shows the apparatus in the fully retracted configuration with the trailer doors opened.

FIGS. 2A and 2B share the same scale and view perspective from the light rear corner. In particular:

FIG. 2A shows both panel groups in the fully retracted configuration.

FIG. 2B shows both panel groups in the fully extended configuration.

FIGS. 2C and 2D share the same scale and partly show the interior of the apparatus with both panel groups in the partially retracted configuration. In particular:

FIG. 2C is a view from the left rear corner.

FIG. 2D is a view from the left front corner.

FIGS. 3A through 3D are all perspective views showing one of the two panel groups of FIGS. 2A through 2D in the fully extended configuration. In particular:

FIGS. 3A and 3B share the same view perspective from the right rear corner. In particular:

FIG. 3A shows the larger panel group of FIGS. 2A through 2D.

FIG. 3B shows the smaller panel group of FIGS. 2A through 2D.

FIGS. 3C and 3D share the same scale and view perspective from the left rear corner and partly show the interior of the panel group. In particular:

FIG. 3C shows the smaller panel group of FIGS. 2A through 2D.

FIG. 3D shows the larger panel group of FIGS. 2A through 2D.

FIGS. 4A through 4C share the same view perspective from the left rear corner. In particular:

FIG. 4A shows the panels in the fully extended configuration.

FIG. 4B shows the panels in the partially retracted configuration.

FIG. 4C shows the panels in the fully refracted configuration.

FIGS. 4D through 4F share the same view perspective from the right rear corner. In particular:

FIG. 4D shows the panels in the fully extended configuration.

FIG. 4E shows the panels in the partially retracted configuration.

FIG. 4F shows the panels in the fully retracted configuration.

FIGS. 5A through 5C have the same view perspective as FIGS. 4D through 4F. In particular:

FIG. 5A shows the panels in the fully extended configuration.

FIG. 5B shows the panels in the partially retracted configuration.

FIG. 5C shows the panels in the fully refracted configuration.

FIG. 5D has the same view perspective as FIGS. 4A through 4C and shows the panels in the fully extended configuration.

FIGS. 6A through 6D are all perspective views of the same scale as FIGS. 4A through 4F, showing several panels of the panel group of FIGS. 3A and 3D). Top and bottom panels have been removed for the purpose of illustration. In particular:

FIGS. 6A and 6B show the panels in the fully extended configuration. In particular:

FIG. 6A has the same view perspective as FIGS. 4A through 4C.

FIG. 6B has the same view perspective as FIGS. 4D through 4F.

FIGS. 6C and 6D show the panels in the partially retracted configuration. In particular:

FIG. 6C has the same view perspective as FIGS. 4A through 4C.

FIG. 6D has the same view perspective as FIGS. 4D through 4F.

FIG. 7 has the same view perspective and scale as FIGS. 4D through 4F and shows several panels of the panel group of FIGS. 3A and 3D in the fully retracted configuration. The top, bottom, and rear panels have been removed for the purpose of illustration.

FIG. 8A has the same view perspective as FIGS. 4D through 4F.

FIG. 8B is a right elevation view.

FIGS. 9A through 9N are all views with the same perspective and scale as FIG. 8A, showing individual panels of the panel group of FIGS. 3A, 3D, 8A, and 8B. The configuration specific orientation of each panel is from the panel group in the fully retracted configuration (as shown at FIG. 8A). In particular:

FIG. 9A shows a front panel.
FIG. 9B shows a forward-most top panel.
FIG. 9C shows a forward-most bottom panel.
FIG. 9D shows a forward-most upper triangular panel.
FIG. 9E shows a forward-most lower triangular panel.
FIG. 9F shows a forward-most side panel.
FIG. 9G shows a middle top panel.
FIG. 9H shows a middle bottom panel.
FIG. 9I shows a rearmost upper triangular panel.
FIG. 9J shows a rearmost lower triangular panel.
FIG. 9K shows a rearmost side panel.
FIG. 9L shows the rear panel.
FIG. 9M shows a rearmost top panel.
FIG. 9N shows a rearmost bottom panel.

FIG. 10A shows the panel group in a fully extended configuration.
FIG. 10B shows the panel group in a partially retracted configuration.
FIG. 10C shows the panel group in a fully retracted configuration.

FIG. 12A shows the panel group in a fully extended configuration.
FIG. 12B shows the panel group in a partially retracted configuration.
FIG. 12C shows the panel group in a fully retracted configuration.

FIG. 13A shows the panel group in the fully extended configuration.
FIG. 13B shows the panel group in the partially retracted configuration.
FIG. 13C shows the panel group in the fully retracted configuration.

FIGS. 14A through 14D are all perspective views sharing the same scale, showing a framed panel group from a forth embodiment of the present disclosure. A covering of the framed panel group is not shown for the purpose of illustration. In particular:

FIGS. 14A through 14C have the same scale and view perspective as their counterparts at FIGS. 5A through 5C. In particular:

FIG. 14A shows the framed panel group in a fully extended configuration.
FIG. 14B shows the framed panel group in a partially refracted configuration.
FIG. 14C shows the framed panel group in a fully refracted configuration.

FIG. 14D has the same scale and perspective as its counterpart at FIG. 5D and shows the framed panel group in the fully extended configuration.

FIG. 15A is a view from the upper right corner primarily showing an exterior of the framed panels.
FIG. 15B is a view from the lower right corner primarily showing an interior of the framed panels.

FIG. 16A is a perspective view illustrating a fully dosed joint with the fabric wrapping around the joined panels.
FIG. 16B through 16E illustrates a joint with the fabric folding between the joined panels with a joint-stop and bias spring as optional features. In particular:

FIG. 16B is a perspective view illustrating a partially opened folding fabric joint.
FIGS. 16C through 16E are views perpendicular to a folding axis of the folding fabric joint. In particular:

FIG. 16C illustrates the folding fabric joint fully opened, held by the joint-stop and compressing the bias spring.
FIG. 16D illustrates the folding fabric joint partially opened, contacting the bias spring.
FIG. 16E illustrates the folding fabric joint fully closed.

FIGS. 18A and 18B share the same view perspective from the left rear corner and primarily show an exterior of the lower left quarter panel group. In particular:

FIG. 18A shows the lower left quarter panel group in a fully retracted configuration.
FIG. 18B shows the lower left quarter panel group in a partially refracted configuration.

FIGS. 18C and 18D share the same view perspective from the right front corner and primarily show the interior of the lower left quarter panel group. In particular:

FIG. 18C shows the lower left quarter panel group in the same partially retracted configuration as FIG. 18B.
FIG. 18D shows the lower left quarter panel group in the fully extended configuration of FIG. 17.

FIG. 19A shows the apparatus in a fully extended configuration.
FIG. 19B shows the apparatus in a fully retracted configuration.

FIGS. 20A through 20C share the same view perspective from the left rear corner. In particular:

FIG. 20A shows primarily an interior of the right apparatus half in the fully extended configuration.

FIG. 20B shows the right apparatus half in a partially refracted configuration.

FIG. 20C shows the right apparatus half in the fully refracted configuration.

FIGS. 20D through 20F share the same view perspective from the right rear corner and show primarily an exterior of the right apparatus half. In particular:

FIG. 20D shows the right apparatus half in the fully extended configuration.

FIG. 20E shows the right apparatus half in the partially retracted configuration.

FIG. 20F shows the right apparatus half in the fully refracted configuration.

FIGS. 21A through 21D show a seventh embodiment of the present disclosure rear mounted and adapted for use behind a sports-utility vehicle. A fairing is included between the sports-utility vehicle and an aerodynamic drag reducing apparatus that is shown in a fully extended configuration. In particular:

FIG. 21A is a perspective view from the left rear corner.

FIG. 21B is a left elevation view.

FIG. 21C is a partial top plan view.

FIG. 21D is a rear elevation view.

FIGS. 22A through 22C show the sports-utility vehicle, the fairing, and the aerodynamic drag reducing apparatus of FIGS. 21A through 21D. The aerodynamic drag reducing apparatus is shown in a fully refracted configuration. In particular:

FIG. 22A is a perspective view from the left rear corner.

FIG. 22B is a partial left elevation view.

FIG. 22C is a partial top plan view.

FIGS. 23A through 23C show a first section of the aerodynamic drag reducing apparatus of FIGS. 21A through 21D with view perspectives from the left rear corner. In particular:

FIG. 23A shows the first section of the apparatus in the fully extended configuration.

FIG. 23B shows the first section of the apparatus in a partially refracted configuration.

FIG. 23C shows the first section of the apparatus in the fully retracted configuration.

FIGS. 24A and 24B are partial views showing a sub-set of frames and joints of the first section of FIGS. 23A through 23C of the aerodynamic drag reducing apparatus of FIGS. 21A through 21D with a common view perspective from the top left corner. In particular:

FIG. 24A shows the sub-set of frames and joints in the fully extended configuration.

FIG. 24B shows the sub-set of frames and joints in the fully retracted configuration.

DETAILED DESCRIPTION

Figure 1A:
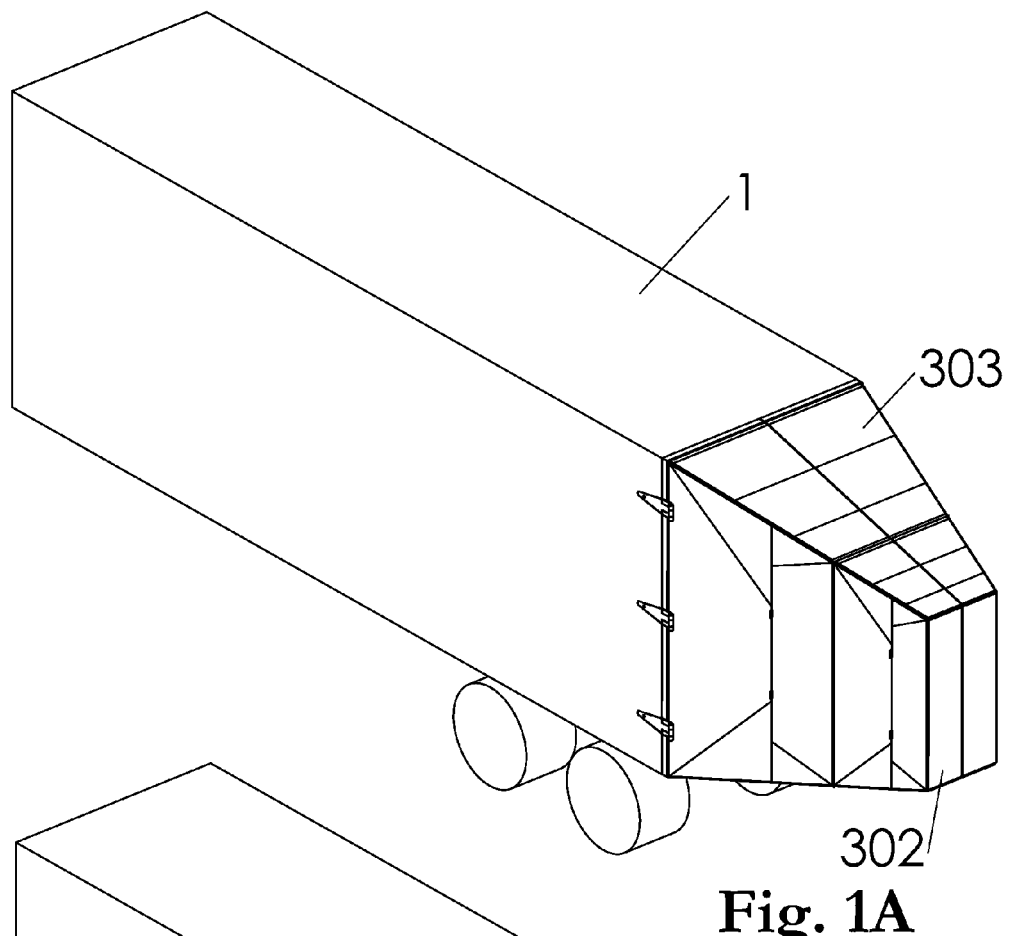
FIGS. 1A through 1M show a first embodiment of the present disclosure rear mounted on an over-the-road trailer in various configurations. In this embodiment, an aerodynamic drag reducing apparatus is in two halves, split right and left. The right and left halves can be opened for access to the rear of the trailer. In particular.

While the present invention is susceptible of embodiment in various forms, there are shown in the drawings and will hereinafter be described presently 30 preferred embodiments with the understanding that the present disclosure is to be considered an exemplification of the invention and is not intended to limit the invention to the specific embodiments illustrated.

The embodiments presented are also shown in various forms and shapes and with various optional features in various combinations. These variations also are exemplifications of the invention and are not intended to limit the combinations of forms, shapes, and optional features.

The present invention is suited for use behind vehicles with vertical or near vertical rear facing surfaces and serves to streamline the vehicle when in an extended configuration. When necessary, the present invention can transform into a retracted configuration to save space. The ability to form two configurations and transform from one to the other without disassembly is made possible by the strategic use of folding panels in an apparatus as described below.

In the present disclosure, the folding panels are arranged into panel groups. Multiple panel groups may be attached to each other in series from front to back within a same apparatus. The panel groups may be individually extended or retracted. When all panel groups are fully extended, the apparatus itself is fully extended and is in a first of its primary configurations. Likewise, when all the panel groups are fully retracted, the apparatus itself is fully retracted and is in a second of its primary configurations. When at least one panel group is extended and at least one panel group is refracted, the apparatus is in a secondary configuration. In certain embodiments, the apparatus can include only a single panel group. In this case, the concept of the "secondary configuration" does not apply. Likewise, the definition of "primary configuration" extends to a panel group but the definition of "secondary configuration" does not.

The panels of the panel groups and folding joints between them support loads imposed on the apparatus by gravity, airflow, uneven roads, and other operational causes. The panels may depend on a framework or multiple frameworks for structural support, or they may serve as their own structural support. The folding joints and structural connections between the panels may take the form of a simple or complex hinge; a linkage; a spherical joint; a sliding spherical joint; a fibrous material, such as fabric or cord; or a solid deformable material, such as plastic. The same apparatus may use both framed and non-framed panels as well as a mixture of joint types.

The folding panels are employed to allow the apparatus to transform between an extended and retracted configuration. The folding joints may take various forms as discussed above and below in any of the embodiments. Furthermore, a given apparatus may employ any of the folding joint forms in any combination. To simplify the discussion in this disclosure, the term "fold-line" is used to represent the folding action of any of the various joint types.

In certain embodiments of the present disclosure, joints between certain panel pairs may both rotate along a hinge-line and linearly slide along the same hinge-line. This type of hinge-line is also considered to be a "fold-line". In other embodiments, particularly those that use a fibrous or solid deformable material as a structural connection between panels, multiple rotational and linear movements can occur between the panels, approximated by a fold-line and dominated by the folding rotation.

Figure 15A:
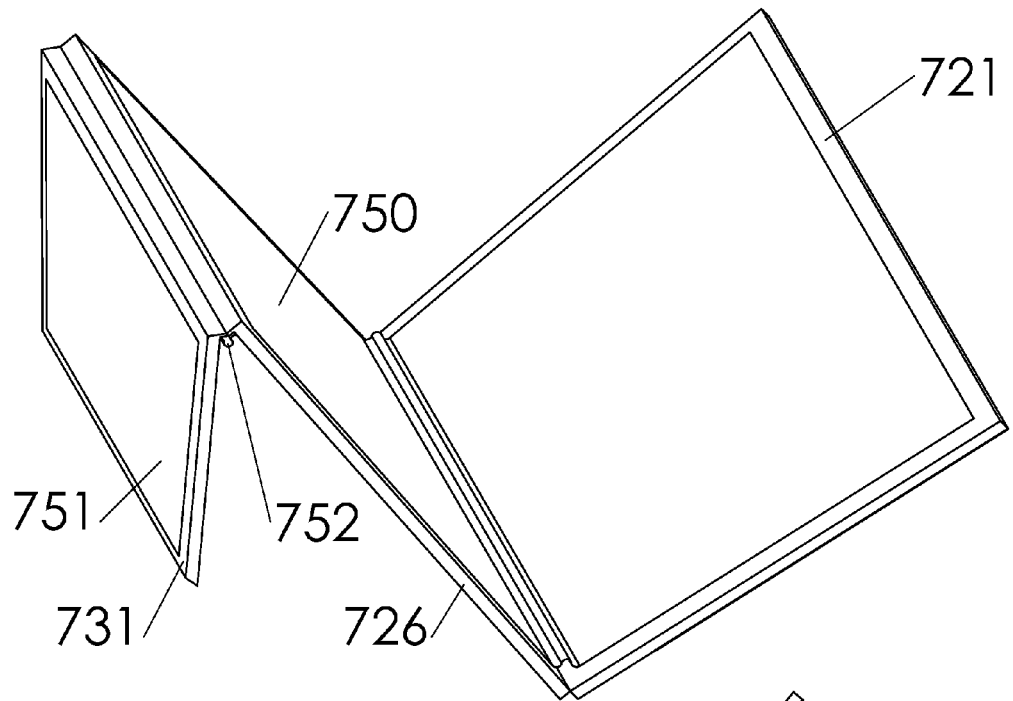
FIGS. 15A and 15B are enlarged perspective views showing three top framed panels and their covering from the framed panel group of FIGS. 14A through 14D in a partially retracted configuration. In particular.
Figure 15B:
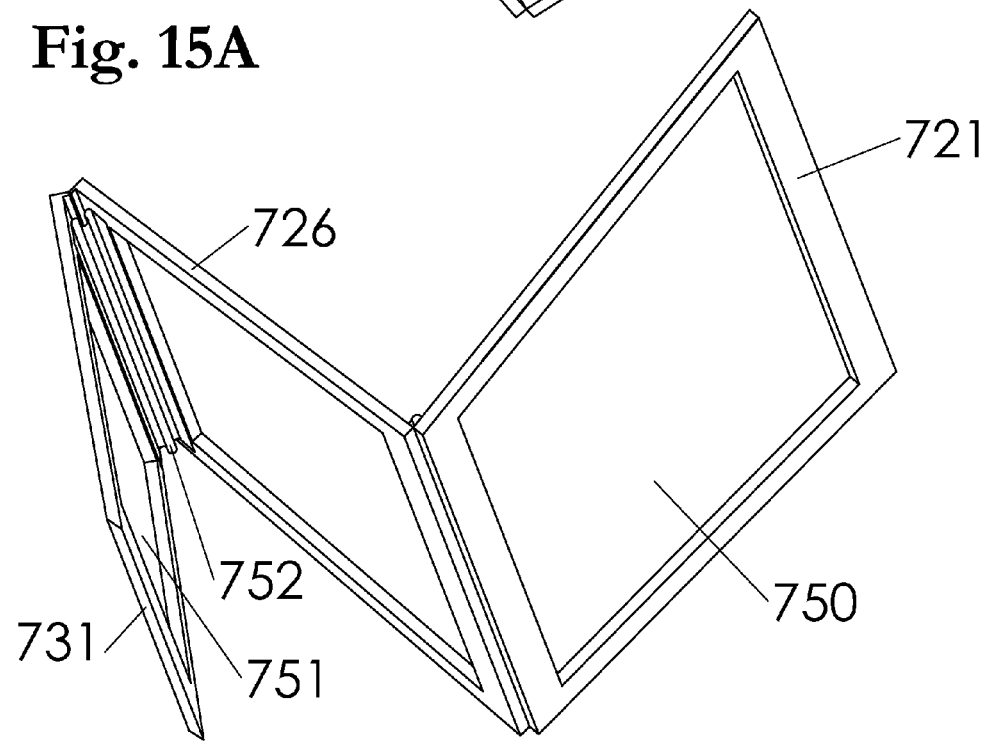
Figure 16A:
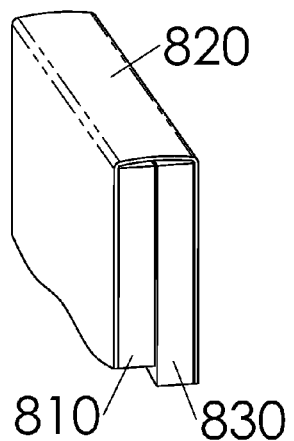
FIGS. 16A through 16E are enlarged partial views illustrating typical folding fabric panel joints. In particular.
Figure 16B:
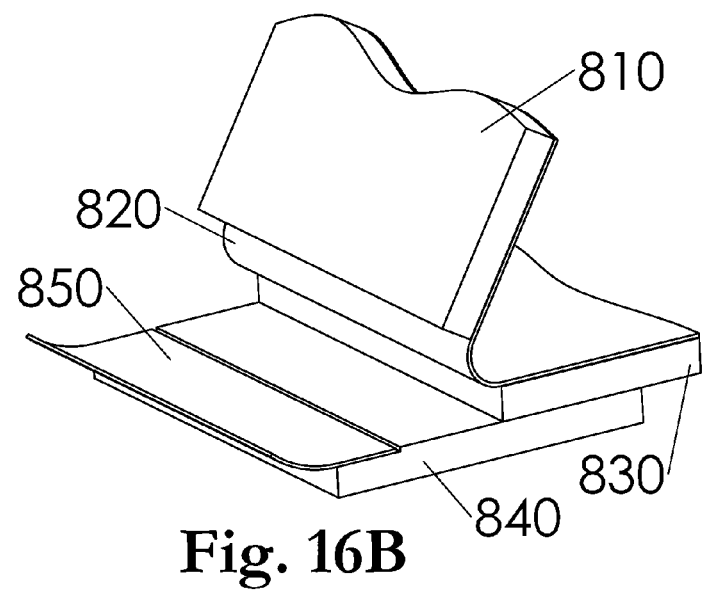
Figure 16C:
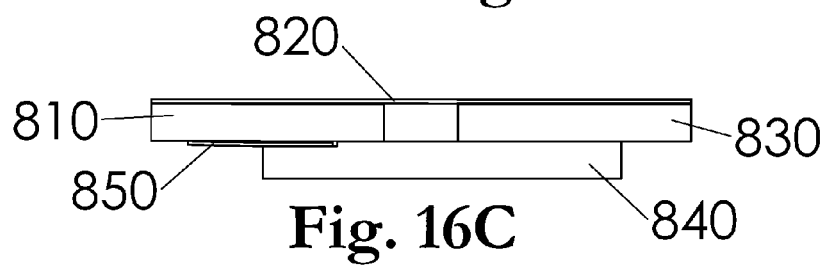
Figure 16D:
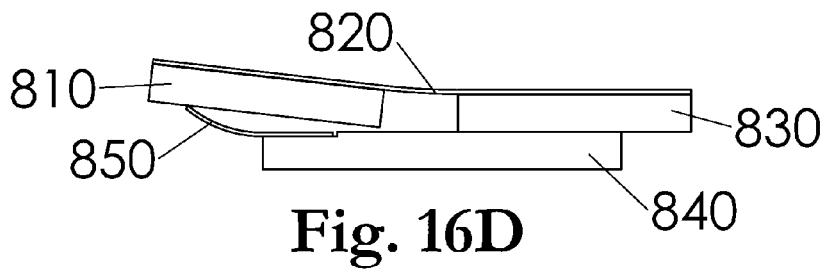
Figure 16E:
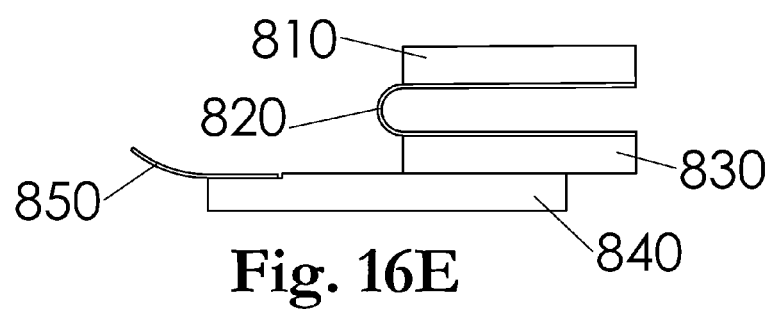
Figure 17:
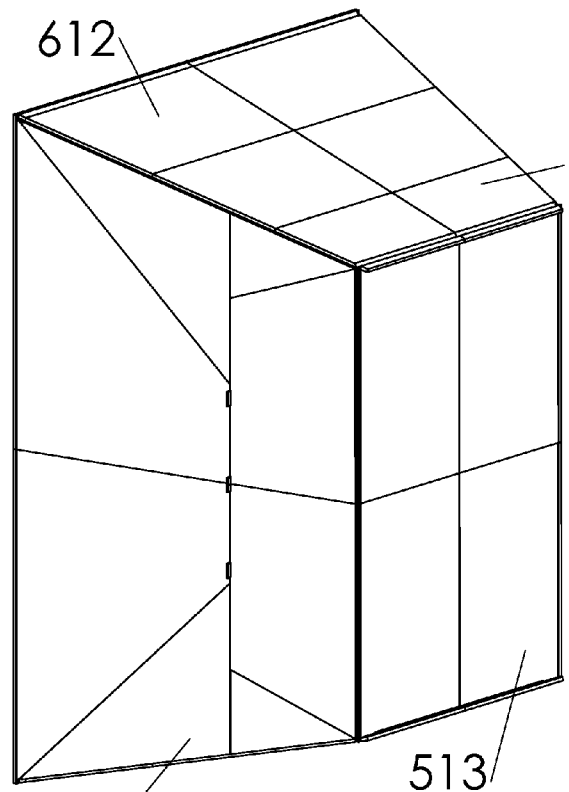
FIG. 17 is a perspective view from the left rear corner, showing a set of four panel groups from a fifth embodiment of the present disclosure in a fully extended configuration. In this embodiment, an aerodynamic drag reducing apparatus is split into four quarters.
Figure 18A:
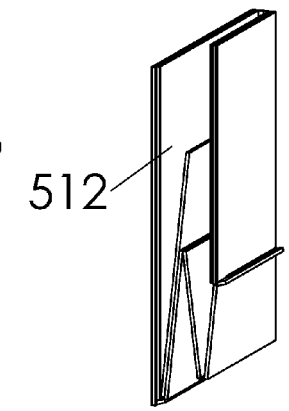
FIGS. 18A through 18D are all perspective views sharing the same scale of FIG. 17 and showing a tower left quarter panel group of FIG. 17. In particular.
Figure 18B:
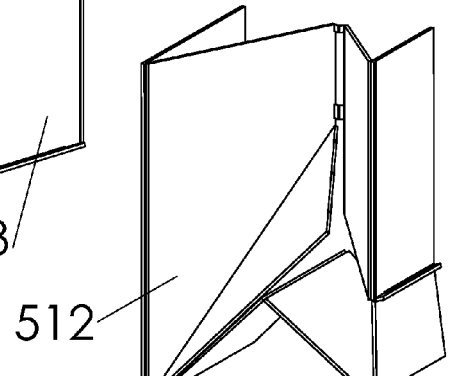
Figure 18C:
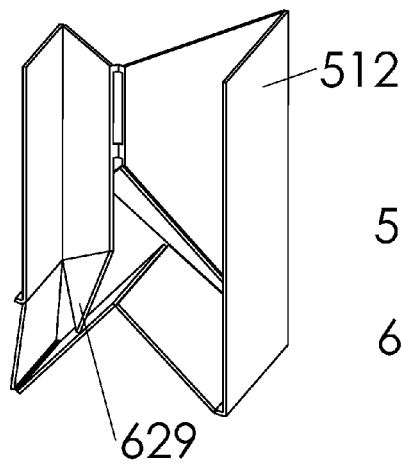
Figure 18D:
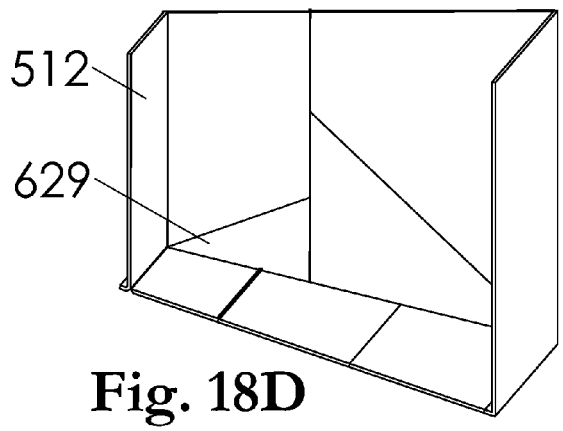

In certain embodiments of the present disclosure, flexible material, such as fabric, may be used to cover framework, forming a framed panel as illustrated at FIGS. 15A and 15B. The flexible material may extend from panel to panel and serve to keep dirt and debris from entering the interior of the apparatus. This is also illustrated at FIGS. 15A and 15B. In certain embodiments, the entire apparatus may be covered by a single continuous piece of flexible material. Optionally, the flexible material may also serve as a structural connection between certain panel pairs as mentioned in the preceding paragraphs and as illustrated at FIGS. 16A through 16E. Flexible material may be located inside and/or outside the panel framework and can fully or partially form the interior and/or exterior of the apparatus. The flexible material can serve to seal the joints, making the apparatus substantially airtight. The flexible material can be connected to each of the panels or frameworks, not connected to any of the panels or frameworks, or connected to select panels or frameworks.

An airtight apparatus can be filled with air or other gas as a method of extending the apparatus. Likewise, the air or other gas can be evacuated to retract the apparatus.

In certain embodiments of the present disclosure, joints between panels may be spring-loaded, as illustrated at FIGS. 16B through 16E. The springs can assist in the extension and/or retraction of the panel groups. Bi-stable springs can also be used that serve to extend and retract the panel groups. The joints can also have detents that aid in maintaining the apparatus in one or both of the primary configurations.

In certain embodiments of the present disclosure, removable parts may be attached to the panels or panel frameworks to keep them in a primary configuration. These parts can be fastened to the panels or panel frameworks by threaded fasteners, latches, hooks, or other means. In certain embodiments, the same removable parts may be used to keep both the extended and retracted configurations by attaching them in a different sequence and joining the features of the panels and the removable parts in different combinations.

Other optional features that can be used separately or together include joint-stops that keep the panel groups from reaching an undesired configuration, as illustrated at FIGS. 16B through 16E; latches that keep the apparatus in the primary configurations; and retraction and extension devices.

In certain embodiments of the present disclosure, pulleys and cables and/or other optional components may be used in a retraction and extension device either separately or together. These include pneumatic and hydraulic cylinders, linear drives, electric motors, gear sets, cord, chain, webbing, cams, and springs.

In certain embodiments of the present disclosure, certain panels or panel frameworks may deform from one configuration to the next or while transitioning between configurations. In certain cases, this is necessary to avoid kinematic lockup. This deformation will cause forces and moments to develop within and between the panels. These forces and moments may be employed to keep the panel groups stable in one or both primary configurations.

Referring now to the figures, in particular to FIGS. 1A through 1M, there is shown a first embodiment of the present disclosure mounted on an exemplary over-the-road trailer 1. More specifically, a left hand apparatus 302 and a right hand apparatus 303 are mounted and shown in various configurations. FIGS. 2A through 2D show the right hand apparatus 303 in detail and in various configurations. In the present embodiment, a right rear trailer door serves as a mounting platform for the right hand apparatus 303 and can also be integrated to become part of the apparatus 303. An exterior shape of the left hand apparatus 302 is a mirror image of an exterior shape of the right hand apparatus 303. Essentially the same relationships between the left hand door and the left hand apparatus 302 exist as mentioned above for the right. To gain access to a cargo holding area 1a of the trailer 1, the apparatuses 302 and 303 are opened as typical trailer doors or with the trailer doors.

If the apparatuses 302 and 303 are symmetric in a vertical direction, as they are shown at FIGS. 1A through 1M, they can be essentially identical with each other. In this case, the apparatuses 302 and 303 are simply assembled to their respective trailer doors upside down and rotated one-half turn from each other.

Figure 1B:
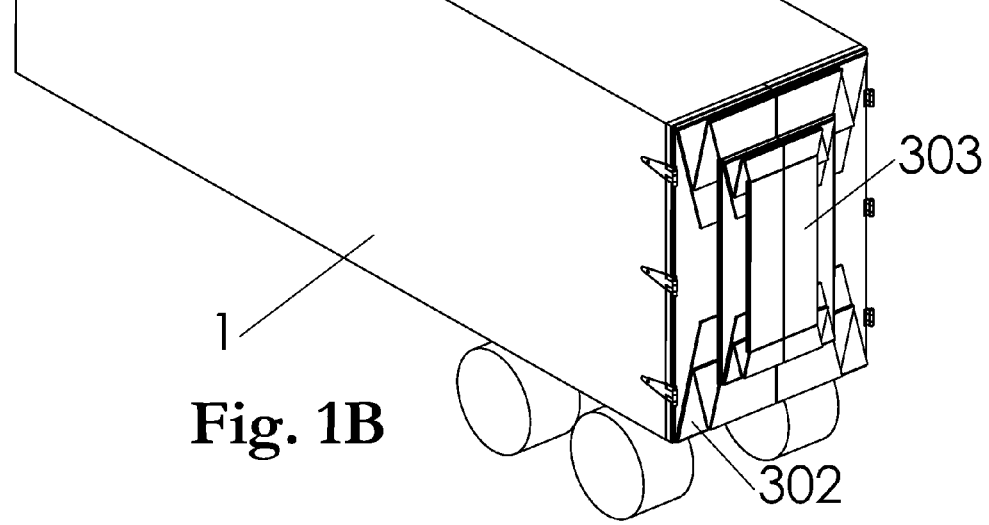
Figure 1C:
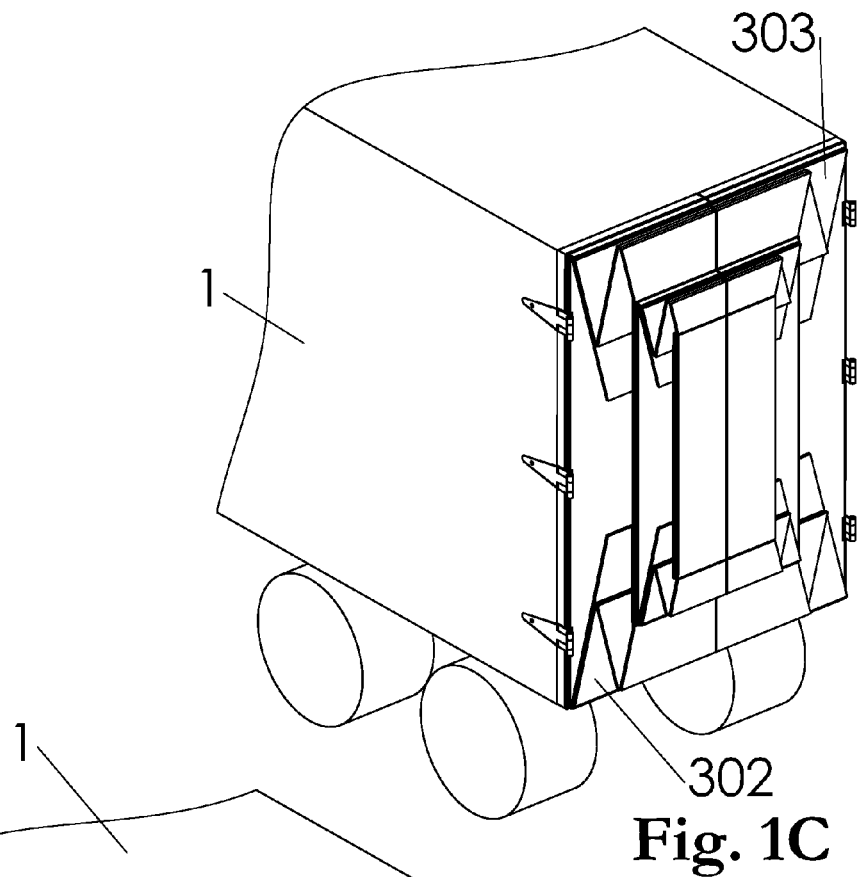
Figure 1D:
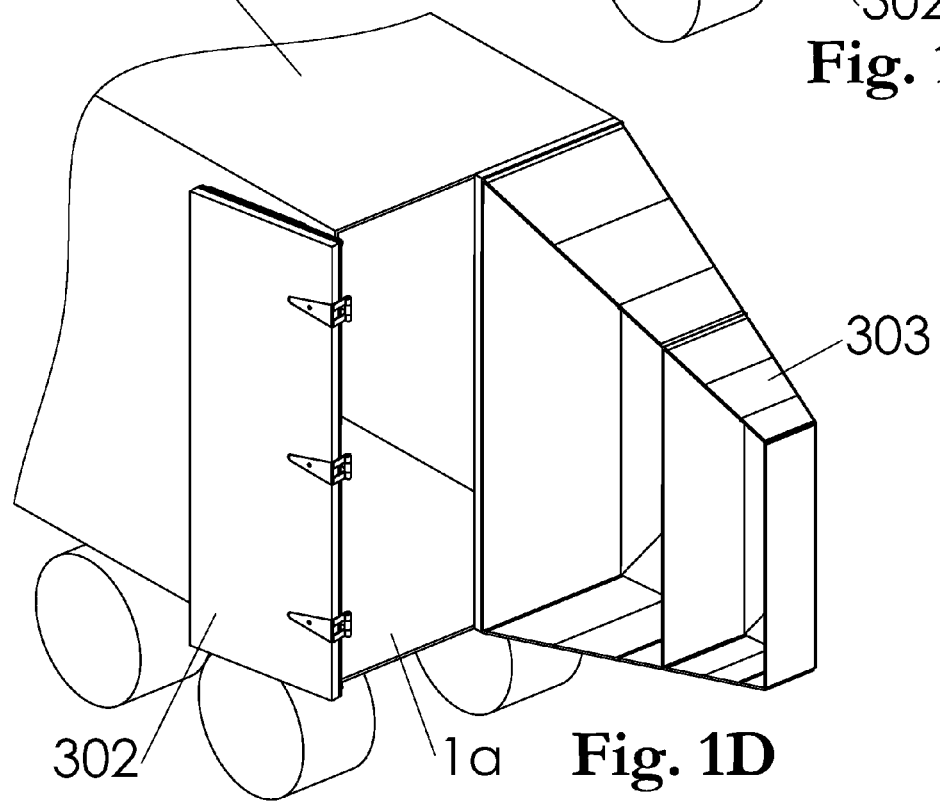
Figure 1E:
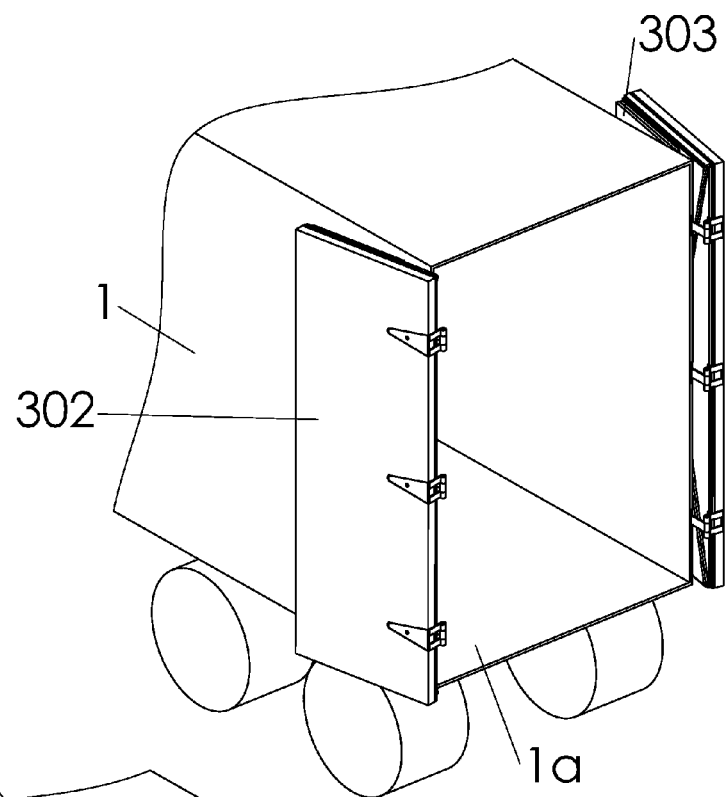

As mentioned above, the apparatuses 302 and 303 are normally used in one of two primary configurations, fully extended and fully retracted. FIG. 1A illustrates the fully extended configuration and FIG. 1B illustrates the fully retracted configuration.

In certain panels of certain embodiments of the present disclosure, clearance cuts 339 may be required to avoid interference with the vehicle, hinges, latches, and other panels. For example, FIG. 9F shows clearance cuts 339 made on a panel 323 to avoid interference with a set of trailer door hinges.

FIGS. 2A through 2D and 3A through 3D illustrate that the panels are arranged in panel groups 311 and 312 having a front and a rear. The panel groups 311 and 312 combine to form the apparatus 303. The front of the panel group 311 farthest upstream attaches to the right rear door of the trailer 1 or the rear facing surfaces of the vehicle as appropriate. The front of the following panel group 312 attaches to the rear of the panel group 311 ahead of it. In these illustrations, only the two panel groups 311 and 312 are shown. In other embodiments of the present disclosure, one panel group may be used alone in an apparatus, or more than two panel groups may be assembled in succession within an apparatus. Mating features between the panel groups 311 and 312, specifically forward mating features of the reward group 312 and rearward mating features of the forward group 311, can be integrated into a single structure serving the requirements of both groups 311, 312. FIGS. 2A through 2D show two panel groups 311 and 312 connected to each other, as they would be in operation. FIGS. 3A and 3D show the larger panel group 311 by itself. Likewise, FIGS. 3B and 3C show the smaller panel group 312 by itself.

The panel groups 311 and 312 are similar to each other in regards to the function of their corresponding top and side panels 321, 322, 323, 324, 325, 326, 327, 328, 329, 330, 331, and 333. The fold-lines 340, 341, 342, 343, 344, 345, 346, 347, 348, 349, 350, 351, 352, 353, 354, 355, 356, 357, 358, and 359, illustrated at FIGS. 9A through 9N, are also similar in function to their corresponding fold-lines from other panel groups 311 and 312. Furthermore, a front panel 320 is similar in function between the panel groups 311 and 312 in that it connects to or is integrated with what comes immediately in front of it. This could be either the trailer door or a rear panel 332 from the panel group 311 that precedes it. Likewise, the rear panel 332 is similar in function between the panel groups 311 and 312 in that it connects to or is integrated with the front panel of the panel group 312 immediately behind it. In the case of the last panel group 312, the rear panel is an exterior panel of the apparatus 302 and 303. The panels belonging to panel groups farther forward (e.g., the panel group 311) are typically larger than their corresponding panels belonging to more rearward panel groups (e.g., the panel group 312).

FIGS. 4A through 4F, 5A through 5D, 6A through 6D, and 7 illustrate the workings of the panel group 311 of a typical embodiment of the present disclosure. This illustration is done by removing certain panels of the panel group 311 from each illustration. Even though different panels are hidden from each illustration, the shape and size of all panels, including the hidden panels, along with the location of their respective fold-lines are used to calculate the kinematic position of each panel throughout its range of motion in each illustration, isolating and studying the relationships between certain subgroups of panels clarifies the function each individual panel and its respective fold-line(s) has in the panel group 311. These descriptions and figures are based on a specific panel group 311 of a specific embodiment of the present disclosure for the purposes of illustration only. Other embodiments of the present disclosure and even other panel groups within the present embodiment will have different proportions and features than those shown. Panel groups of other embodiments of the present disclosure will have different relationships between the panels and can have different quantities of panels. In addition, as mentioned above, frameworks and/or framed panels can be substituted for any or all of the panels.

FIGS. 4A through 4F illustrate the relationships between the front panel 320, a forward-most top panel 321, a forward-most upper triangular panel 322, a forward-most side panel 323, a forward-most lower triangular panel 324, and a forward-most bottom panel 325. These panels 320, 321, 322, 323, 324, and 325 are also shown individually with their respective fold-lines at FIGS. 9A through 9F. The panels 320, 321, 322, 323, 324, and 325 are connected to each other by fold-lines as follows: Fold-line 340 connects the front panel 320 (FIG. 9A) to the forward-most top panel 321 (FIG. 9B). Likewise, fold-line 342 connects the front panel 320 (FIG. 9A) to the forward-most bottom panel 325 (FIG. 9C). Fold-line 341 connects the front panel 320 (FIG. 9A) to the forward-most side panel 323 (FIG. 9F). Fold-line 347 connects the forward-most side panel 323 (FIG. 9F) to the forward-most upper triangular panel 322 (FIG. 9D). Likewise, fold-line 348 connects the forward-most side panel 323 (FIG. 9F) to the forward-most lower triangular panel 324 (FIG. 9E). Fold-line 343 connects the forward-most top panel 321 (FIG. 9B) to the forward-most upper triangular panel 322 (FIG. 9D). Likewise, fold-line 344 connects the forward-most bottom panel 325 (FIG. 9C) to the forward-most lower triangular panel 324 (FIG. 9E). This arrangement of fold-lines 340, 341, 342, 343, 344, 347, and 348 and panels 320, 321, 322, 323, 324, and 325 results in a coordinated deployment of the panel group 311 from the fully retracted to the fully extended configurations and a coordinated stowage of the panel group 311 from the fully extended to the fully refracted configurations. The configuration of panels 320, 321, 322, 323, 324, and 325 within this sub-group is determined by a single variable. Thus, by controlling the angle across any fold-line 340, 341, 342, 343, 344, 347, or 348, the angles across the remaining fold-lines 340, 341, 342, 343, 344, 347, and 348 are determined and the configuration of the panels 320, 321, 322, 323, 324, and 325 is known.

FIGS. 5A through 5D illustrate the relationships between the front panel 320, the forward-most top panel 321, the forward-most bottom panel 325, a middle top panel 326, a middle bottom panel 330, a rearmost top panel 331, the rear panel 332, and a rearmost bottom panel 333. These panels 320, 321, 325, 326, 330, 331, 332, and 333 are also shown individually with their respective fold-lines at FIGS. 9A through 9C, 9G, 9H, and 9L through 9N. The panels 320, 321, 325, 326, 330, 331, 332, and 333 are connected to each other by fold-lines as follows: The fold-line 340 connects the front panel 320 (FIG. 9A) to the forward-most top panel 321 (FIG. 913). Likewise, the fold-line 342 connects the front panel 320 (FIG. 9A) to the forward-most bottom panel 325 (FIG. 9C). Fold-line 345 connects the forward-most top panel 321 (FIG. 98) to the middle top panel 326 (FIG. 9G). Likewise, fold-line 346 connects the forward-most bottom panel 325 (FIG. 9C) to the middle bottom panel 330 (FIG. 9H). Fold-line 350 connects the middle top panel 326 (FIG. 9G) to the rearmost top panel 331 (FIG. 9M). Likewise, fold-line 351 connects the middle bottom panel 330 (FIG. 9H) to the rearmost bottom panel 333 (FIG. 9N). Fold-line 355 connects the rearmost top panel 331 (FIG. 9M) to the rear panel 332 (FIG. 9L). Likewise, fold-line 356 connects the rearmost bottom panel 333 (FIG. 9N) to the rear panel 332 (FIG. 9L). Unlike the preceding sub-group, this sub-group of panels 320, 321, 325, 326, 330, 331, 332, and 333 by themselves does not form a configuration that can be determined by a single variable. Instead, this sub-group relies on the panel group 311 as a whole to determine its configuration.

FIGS. 6A through 6D illustrate the relationships between the front panel 320, the forward-most upper triangular panel 322, the forward-most side panel 323, the forward-most lower triangular panel 324, a rearmost upper triangular panel 327, a rearmost side panel 328, a rearmost lower triangular panel 329, and the rear panel 332. These panels 320, 322, 323, 324, 327, 328, 329, and 332 are also shown individually with their respective fold-lines at FIGS. 9A, 9D through 9F, and 91 through 9L. The panels 320, 322, 323, 324, 327, 328, 329, and 332 are connected to each other by fold-lines as follows: The fold-line 341 connects the front panel 320 (FIG. 9A) to the forward-most side panel 323 (FIG. 9F). The fold-line 347 connects the forward-most side panel 323 (FIG. 9F) to the forward-most upper triangular panel 322 (FIG. 9D). Likewise, the fold- line 348 connects the forward-most side panel 323 (FIG. 9F) to the forward-most lower triangular panel 324 (FIG. 9E). Fold-line 349 connects the forward-most side panel 323 (FIG. 9F) to the rearmost side panel 328 (FIG. 9K). Fold-line 352 connects the rearmost side panel 328 (FIG. 9K) to the rearmost upper triangular panel 327 (FIG. 91). Likewise, fold-line 353 connects the rearmost side panel 328 (FIG. 9K) to the rearmost lower triangular panel 329 (FIG. 91). Fold-line 354 connects the rearmost side panel 328 (FIG. 9K) to the rear panel 332 (FIG. 9L). As with the preceding sub-group, this sub-group of panels 320, 322, 323, 324, 327, 328, 329, and 332 by themselves does not form a configuration that can be determined by a single variable. This sub-group also relies on the panel group 311 as a whole to determine its configuration. In this example embodiment, the rearmost upper and lower triangular panels 327 and 329 must fold to prevent interference between themselves and the rearmost top and bottom panels 331 and 333 respectively. This folding is needed during a portion of the extension-refraction process and can be most clearly observed at FIGS. 2C and 2D. The position of the rearmost upper and lower triangular panels 327 and 329 is determined by their contact with the rearmost top and bottom panels 331 and 333 respectively or by a joint-stop keeping them parallel with the rearmost side panel 328. The related fold-lines 352 and 353 can be spring-loaded, keeping the panels 327 and 329 against their respective stops until contact is made with the rearmost top and bottom panels 331 and 333 respectively.

In the case that the front panel of the rearward panel group 312 and the rear panel 332 of the preceding panel group 311 are integrated, additional fold-lines will be found on the combined panel to serve their corresponding purpose for both panel groups 311 and 312. This is illustrated at FIG. 9L where fold-lines 357, 358, and 359 are present. These fold-lines 357, 358, and 359 serve the same purpose as fold-lines 340, 341, and 342 as shown at FIG. 9A, but for the following panel group 312.

The panel group 311, with all panels 320, 321, 322, 323, 324, 325, 326, 327, 328, 329, 330, 331, 332, and 333 present, forms an assembly whose configuration is determined by a single variable. This is of great benefit whether the apparatuses 302 and 303 are deployed manually or by automated means, as each panel group can be managed with a single variable rather than as multiple individual panels. Furthermore, it is possible to coordinate the panel groups 311, 312 with each other so that the configuration of the entire apparatus 303 or pair of apparatuses 302, 303 can be managed by a single variable.

Figure 10A:
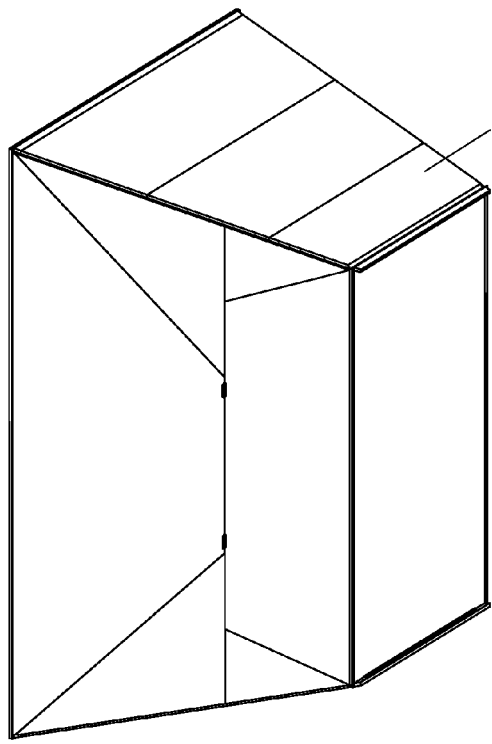
FIGS. 10A through 10C are all perspective views sharing the same scale and perspective from the left rear corner, showing a panel group from a second embodiment of the present disclosure in various configurations. In this embodiment, an aerodynamic drag reducing apparatus is not split in two halves, but is formed of panel groups that span a vehicle. In particular.
Figure 10B:
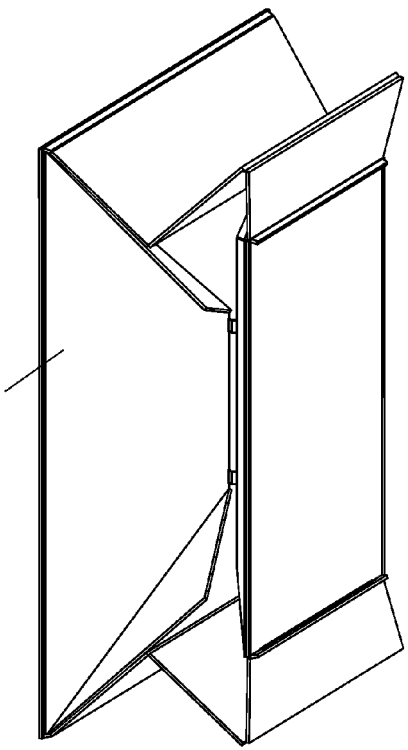
Figure 10C:
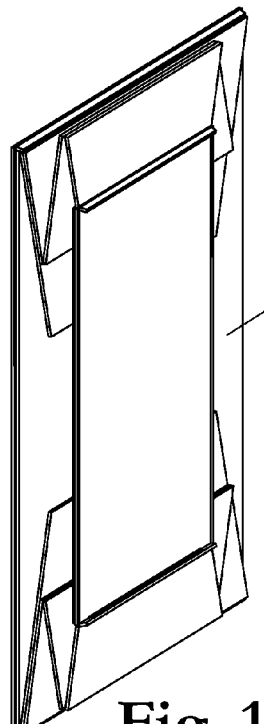
Figure 11:
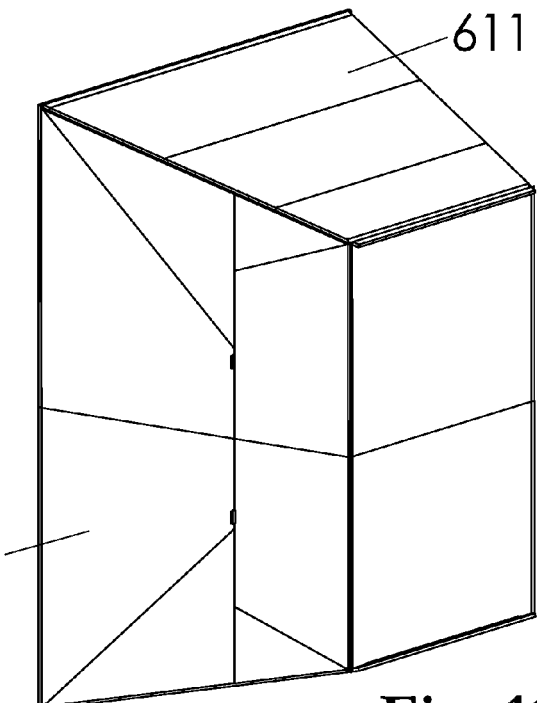
FIG. 11 is a perspective view from the left rear corner, showing a pair of panel groups from a third embodiment of the present disclosure in a fully extended configuration. In this embodiment, an aerodynamic drag reducing apparatus is split in two halves, one upper and one lower.
Figure 12A:
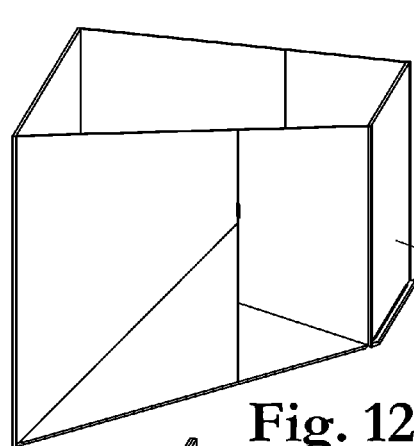
FIGS. 12A through 12C are all perspective views sharing the same scale and perspective from the left rear corner, showing the lower panel group of FIG. 11. In particular.
Figure 12B:
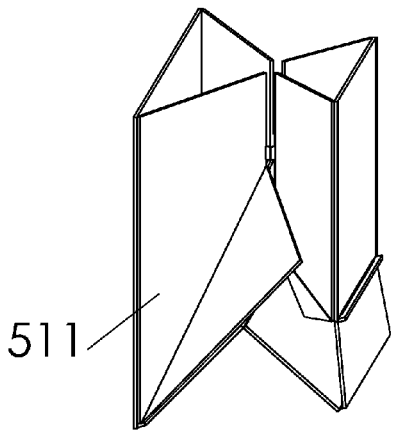
Figure 12C:
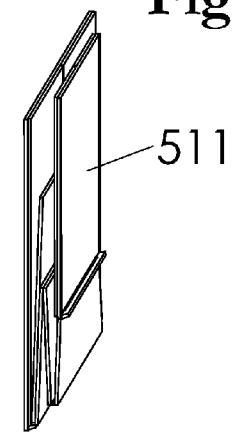

The discussions above focus primarily on an embodiment of the present disclosure suited for vehicles with rear doors having vertical hinge-lines served by two apparatuses 302 and 303. Vehicles and trailers with neither rear doors nor need for access to the rear of the vehicle are better served by a second embodiment of the present disclosure that spans the width of the vehicle. This embodiment is formed by combining the two apparatuses 302 and 303, at their common edges, into a single apparatus, as illustrated by the panel group 411 at FIGS. 10A through 10C. More specifically, the right hand and left hand versions of the panel group 311 are combined by joining the common edges of the front, rear, top, and bottom panels 320, 321, 325, 326, 330, 331, 332, and 333. As in the previous embodiment, multiple panel groups can be arranged one behind the other to form an extended apparatus. As in the preceding panel groups 311 and 312, the configuration of the combined panel group 411 is also controlled by a single variable.

The embodiment of the preceding paragraph may be adapted for use with vehicles having rear doors by mounting the combined apparatus on a support panel, door, or framework that in turn is mounted on a hinge, linkage, or linear slide, the whole apparatus can thus be temporarily moved when access to the rear of the vehicle is required.

Figure 13A:
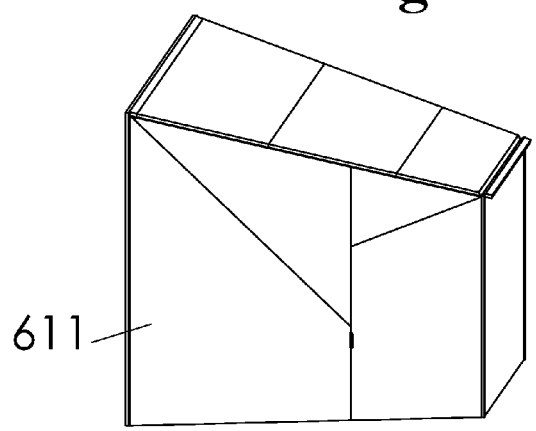
FIGS. 13A through 13C are all perspective views sharing the same scale and perspective as FIGS. 12A through 12C, showing the upper panel group of FIG. 11. In particular.
Figure 13B:
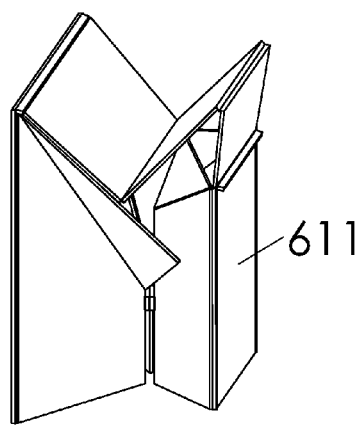
Figure 13C:
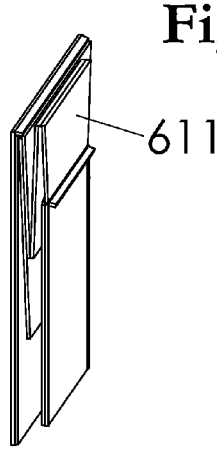

A third embodiment of the present disclosure is arrived at by splitting the apparatus in the preceding paragraph, exemplified by panel group 411, about a horizontal plane near its center, creating two halves: one upper apparatus and one lower apparatus. This embodiment is illustrated by the panel groups 511 and 611 shown at FIGS. 11, 12A through 12C, and 13A through 13C. This embodiment is suited for use on vehicle doors with horizontal hinges. This embodiment could also be rotated ninety degrees and used on vehicles whose doors have vertical hinges. As in the previous embodiments, panel groups in successively smaller sizes can be connected one behind the other to extend the gently sloping surfaces and reduce the rear-facing area of the vehicle in the fully extended configuration. This embodiment retains the desirable characteristics of stability and configuration by a single variable. Panel groups of this embodiment can be used individually. For example, the panel group 611 at FIGS. 13A through 13C could be used behind the cab of a pickup truck.

A fourth embodiment of the present disclosure includes panels and/or framed panels 721, 722, 724, 726, and 731 combined to form a panel group 711 as illustrated at FIGS. 14A through 14D, 15A and 15B. Coverings 750, 751, and 752 (not shown at FIGS. 14A through 14D) are formed of flexible material and attached to certain areas of certain panels 721, 722, 724, 726, and 731. Certain coverings 750 and 752 may attach to and/or cover two or more panels or framed panels 721, 722, 724, 726, and 731. Certain forms of the current embodiment have a single covering substantially forming the exterior surface of the apparatus. Certain panels and framed panels may not attach to the covering but serve to provide a shape and structural support for it. Certain panels, such as counterparts to panels 327 and 329 (illustrated at FIGS. 3A and 3D), are not required by this embodiment. Other panels 722 and 724 (counterparts to panels 322 and 324 also illustrated at FIGS. 3A and 3D) may take a shape that does not fully fill the apparatus' exterior when it is fully extended but still provide required structural and kinematic support. In these cases, the exterior shape of the extended apparatus in these areas is determined by the panels and/or framed panels adjoining the removed or reduced panels. A covering can span any void created by the removed or reduced panels in the extended configuration and attach to other panels of the apparatus. The present embodiment may be adapted to and combined with the other embodiments of the present disclosure.

A fifth embodiment of the present disclosure can be arrived at by splitting the third embodiment about a vertical plane near its center as illustrated by FIGS. 17 and 18A through 18D. This embodiment retains the desirable characteristics of stability and configuration by a single variable. In contrast to certain embodiments above which combine a pair of apparatuses to cover the rear surface of a vehicle, this embodiment requires four apparatuses 512, 513, 612, and 613 arranged in quarters. In the example of the pickup truck, only the upper two quarters 612 and 613 would be required. Just as in the embodiments above, multiple panel groups can be arranged one behind the other. This embodiment may be combined with the embodiment of the preceding paragraph. In this case, panel 629 is not required. The hole in the extended configuration crated by the removal of panel 629 is spanned by a covering. The shape of the covering over this hole when the apparatus is in the extended configuration is determined by panel edges adjacent to the hole.

FIGS. 16A through 16E further illustrate the fabric joint type. More specifically, a first panel or framed panel 810 is joined by fabric 820 which in turn is also joined to a second panel 830. Unlike a common hinge, this joint type does not have a precisely defined hinge-line. Nonetheless, a folding action is made possible with sufficient precision for certain embodiments of the present disclosure.

Optional joint-stops 840 and bias springs 850, as illustrated at FIGS. 16B through 16E, can be added to certain joints of any of the various joint types.

Figure 19A:
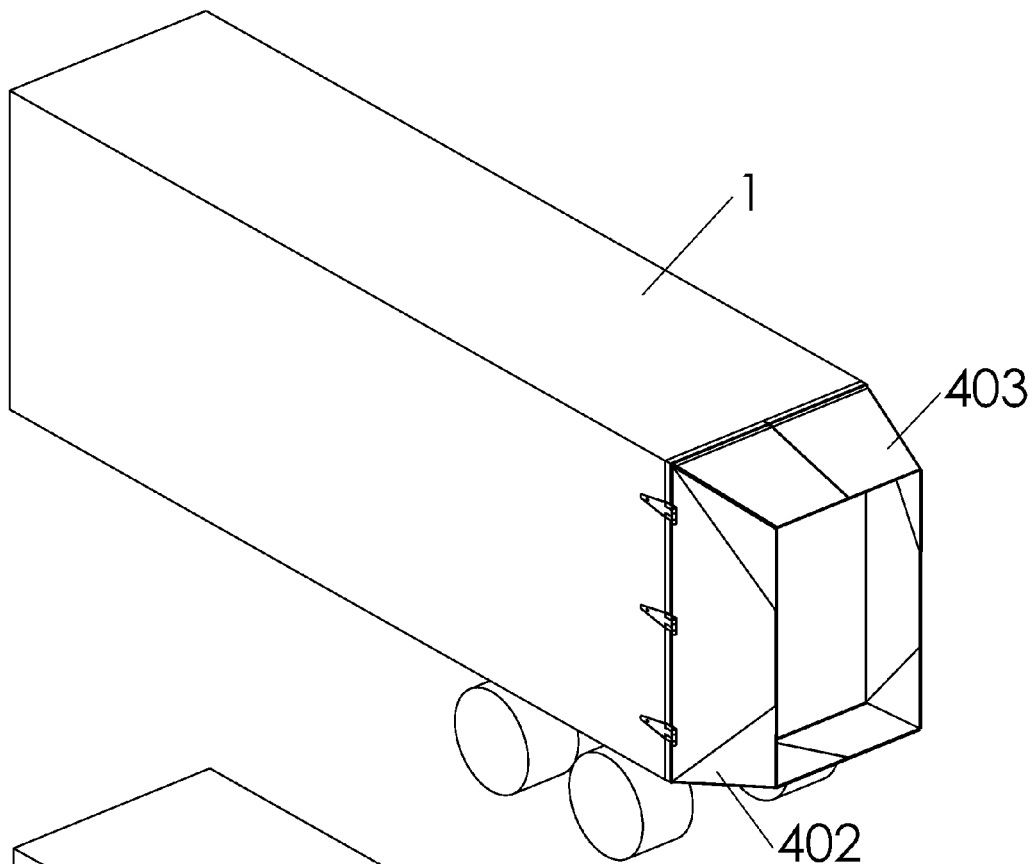
FIGS. 19A and 19B are left rear perspective views showing a sixth embodiment of the present disclosure rear mounted on the over-the-road trailer with the right and left trailer doors closed. In this embodiment, a simplified aerodynamic drag reducing apparatus is in two halves, split right and left. The right and left halves can be opened for access to the rear of the trailer. In particular.
Figure 19B:
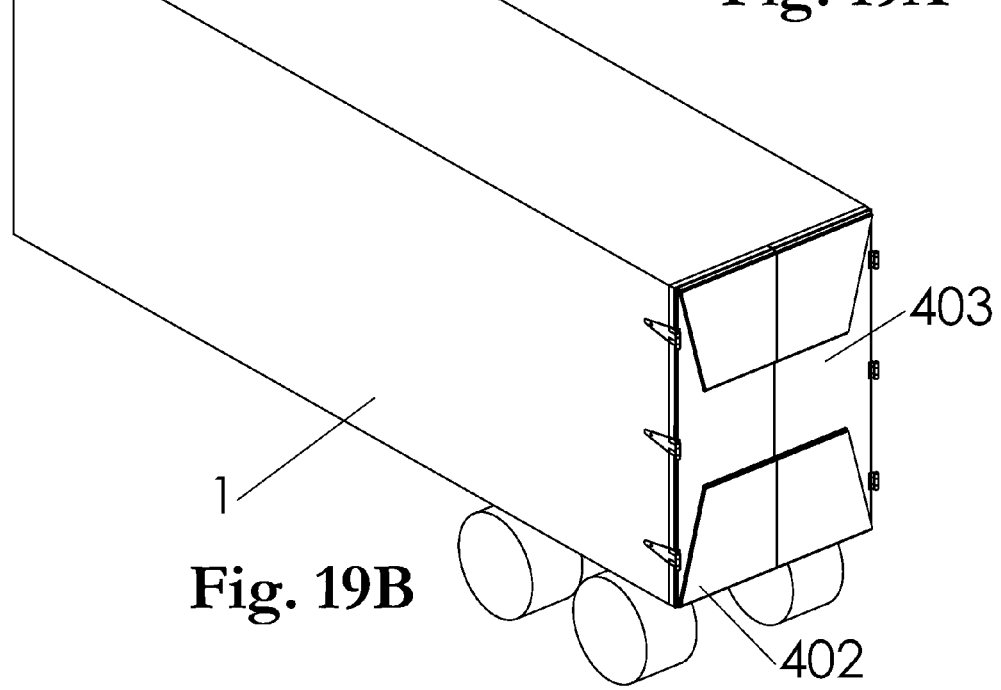
Figure 20A:
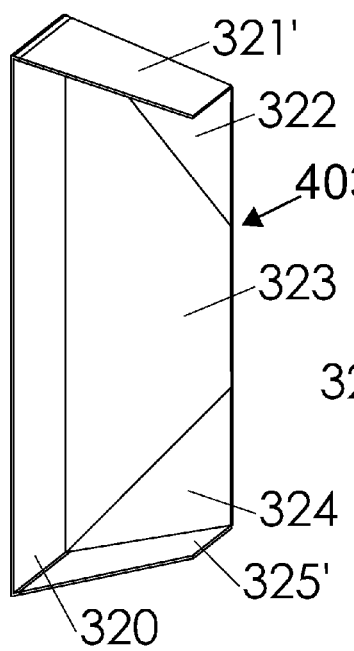
FIGS. 20A through 20F are all perspective views of the same scale showing the right apparatus half of FIGS. 19A and 19B by itself in various configurations. In particular.
Figure 20B:
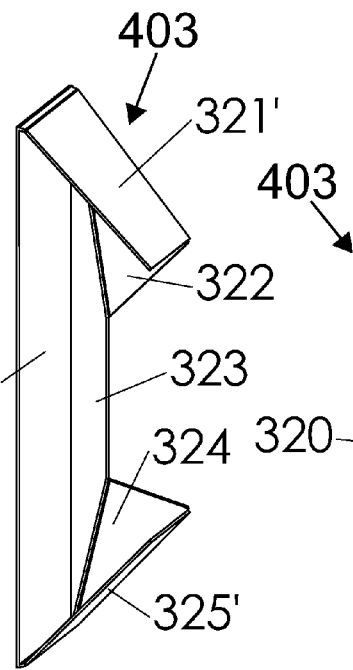
Figure 20C:
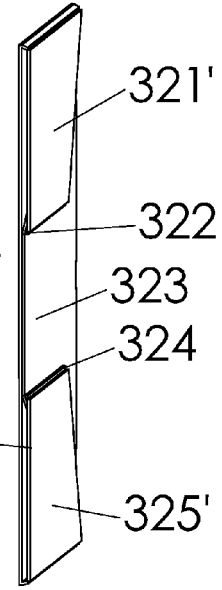
Figure 20D:
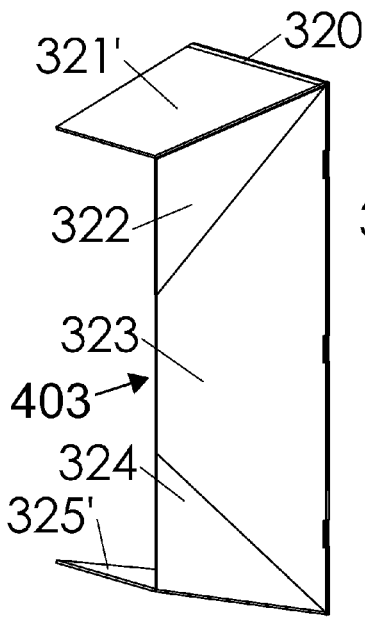
Figure 20E:
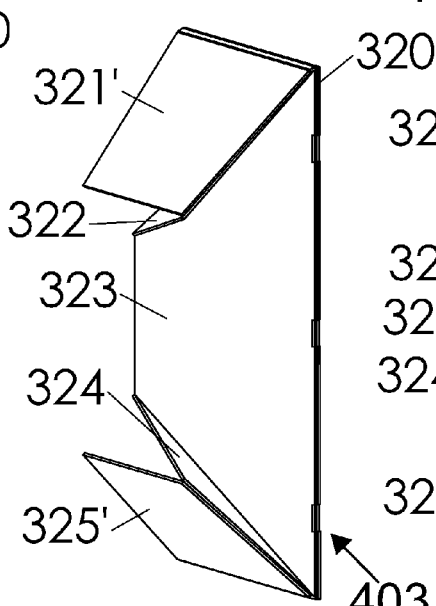
Figure 20F:
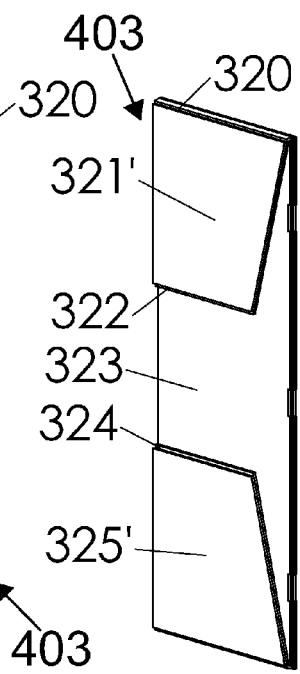
Figure 21C:
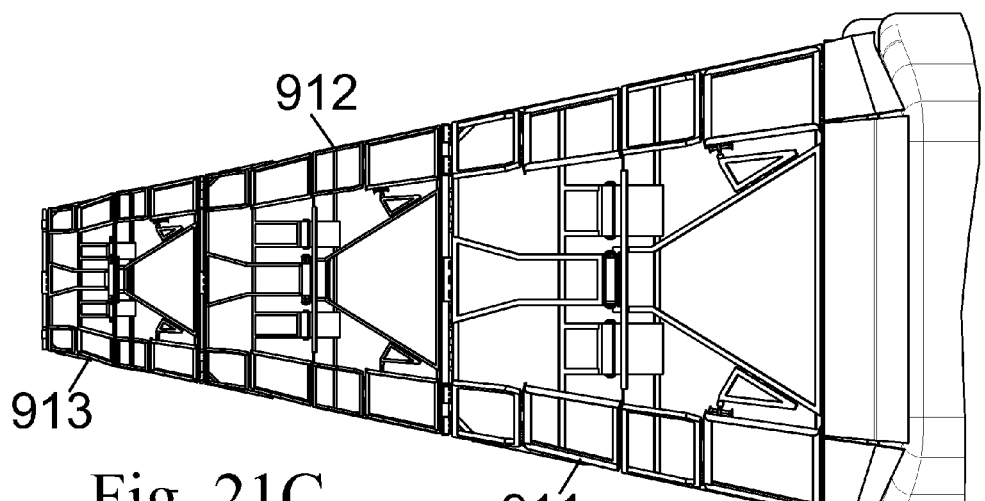

A sixth simplified embodiment of the present disclosure includes the front panel 320 (FIG. 9A), the top panel 321 (FIG. 9B), the upper triangular panel 322 (FIG. 9D), the side panel 323 (FIG. 9F, the lower triangular panel 324 (FIG. 9E), and the bottom panel 325 (FIG. 9C). The resulting apparatus takes a form similar to that shown at FIGS. 4A through 4F with no rear panel. A single variable defines the configuration of this apparatus as in the first sub-group discussed above. In this embodiment, the top panel 321 and the bottom panel 325 can be extended giving an extended top panel 321' and an extended bottom panel 325'. FIGS. 19A and 19B illustrate the sixth embodiment. Left and right apparatuses 402, 403, including the extended top panel 321' and the extended bottom panel 325', mount on the rear of the trailer 1 or the trailer doors. FIGS. 20A through 20F further illustrate the right apparatus 403 in various configurations and are similar to FIGS. 4A through 4F. In particular, FIGS. 19A, 20A, and 20D show the right apparatus 403 in an extended configuration while FIGS. 19B, 20C, and 20F show the right apparatus 403 in a retracted configuration. In this embodiment of the present disclosure, additional panel groups, as described above, cannot be attached to the rear of the panels 321, 322, 323, 324, and 325 (or 321', 322, 323, 324, and 325'). As with the other embodiments of the present disclosure, the front panel 320 can be a framework, can be integrated with the trailer door, or can be integrated with the vehicle.

The panels 321', 322, 323, 324, and 325' of the apparatus 403 can be spring biased towards the retracted configuration. In certain embodiments, partial vacuum behind the moving trailer 1 overcomes the spring bias and automatically extends the left and right apparatuses 402, 403. As the moving trailer 1 slows and stops, the spring bias again retracts the left and right apparatuses 402, 403. This method of automatically deploying and retracting the aerodynamic drag reducing apparatus can also be implemented on the other embodiments of the present disclosure.

A seventh example embodiment of the present disclosure is illustrated at FIGS. 21A through 22C. In particular, FIGS. 21A through 21D illustrate a fairing 910 behind a sportsutility-vehicle (SUV) 901. The fairing 910 joins and/or adapts the SUV 901 to a first framework group 911. The first framework group 911 is joined to and followed by a second framework group 912 that, in turn, is followed by a third framework group 913. The framework groups 911, 912, 913 are covered by a flexible covering similar to that described above. The flexible covering provides an aerodynamic drag reducing surface when the framework groups 911, 912, 913 are in an extended configuration as illustrated at FIGS. 21A through 21D. FIG. 21D illustrates that an exterior shape of the SUV 901 may approximately match an exterior shape of the framework groups 911, 912, 913 in the extended configuration. FIGS. 22A through 22C illustrate the framework groups 911, 912, 913 in a refracted, space-saving, configuration.

Figure 23A:
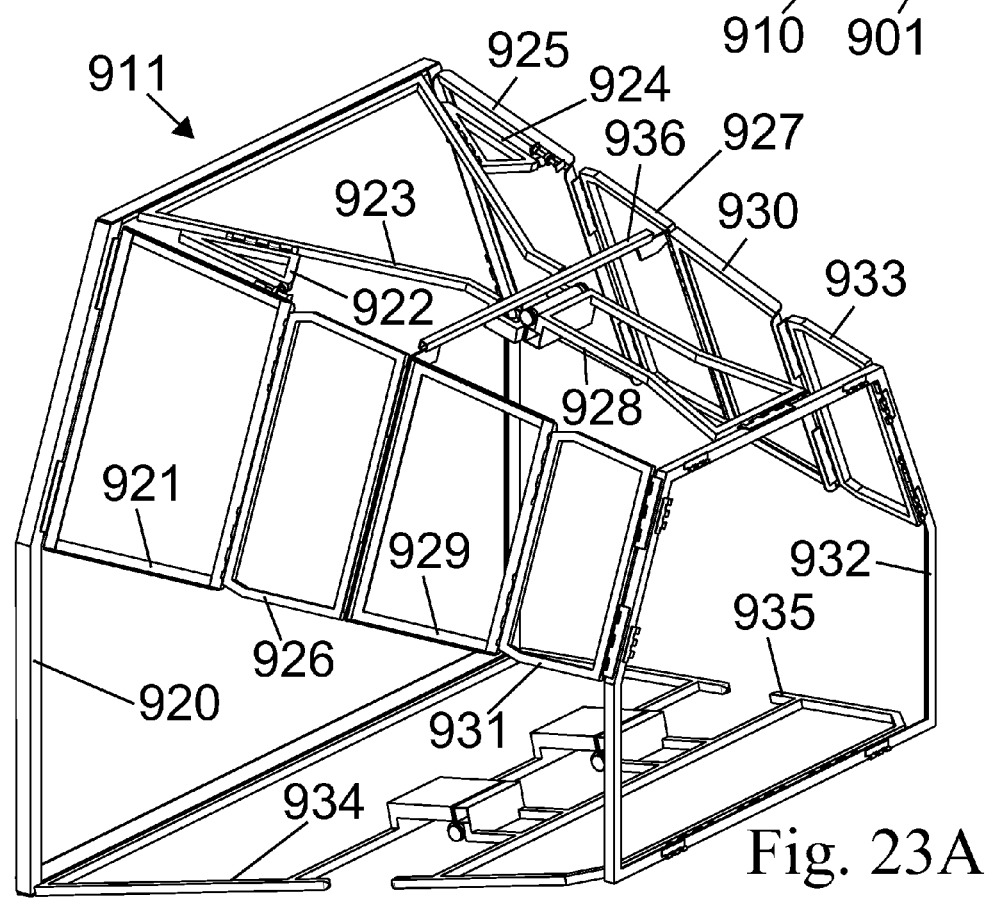

The first framework group 911 is further illustrated at FIGS. 23A through 23C. The framework groups 912 and 913 are similar but progressively smaller than the framework group 911. In the example embodiment, illustrated at FIGS. 23A through 23C, the first framework group 911 includes a front frame 920, a first left frame 921, a left triangular frame 922, a first top frame 923, a right triangular frame 924, a first right frame 925, a second left frame 926, a second right frame 927, a second top frame 928, a third left frame 929, a third right frame 930, a fourth left frame 931, a rear frame 932, a fourth right frame 933, a first bottom frame 934, a second bottom frame 935, and a right-to-left coordinating link 936. FIG. 23A illustrates the framework group 911 in the extended configuration. FIG. 23B illustrates the framework group 911 in a partially retracted configuration, and FIG. 23C illustrates the framework group 911 in the refracted configuration. Similar to the embodiments discussed above, the seventh embodiment of the present disclosure relies on fold-lines between the frames 920, 921, 922, 923, 924, 925, 926, 927, 928, 929, 930, 931, 932, 933, 934, 935, and the coordinating link 936 to transition between the extended and the retracted configurations.

FIGS. 24A and 24B further illustrate several relationships between certain frames 920, 922, 923, 924, and 925 and fold-lines joining them. In particular, the front frame 920 is connected to the first top frame 923 at a hinge defining a fold-line 950. The front frame 920 is also connected to the first right frame 925 at a hinge defining a fold-line 952. The left triangular frame 922 is connected to the first top frame 923 at a hinge defining a fold-line 954. Likewise, the right triangular frame 924 is connected to the first top frame 923 at a hinge defining a fold-line 956. Other hinge connections between certain frames not illustrated at FIGS. 24A and 24B include connections between the front frame 920 and the first left frame 921, the first left frame 921 and the second left frame 926, the first right frame 925 and the second right frame 927, the second left frame 926 and the third left frame 929, the second right frame 927 and the third right frame 930, the third left frame 929 and the fourth left frame 931, the third right frame 930 and the fourth right frame 933, the fourth left frame 931 and the rear frame 932, the fourth right frame 933 and the rear frame 932, first top frame 923 and the second top frame 928, the second top frame 928 and the rear frame 932, the front frame 920 and the first bottom frame 934, the first bottom frame 934 and the second bottom frame 935, and, finally, the second bottom frame 935 and the rear frame 932. The coordinating link 936 can share a common hinge/fold-line with the second left frame 926 and the third left frame 929 on one end and share a common hinge/fold-line with the second right frame 927 and the third right frame 930 on the other end as illustrated at FIGS. 23A through 23C.

FIGS. 24A and 24B also illustrate joints between certain frames that are not simple hinges. In particular, the right triangular frame 924 is connected to the first right frame 925 by a spherical joint within a rod-eye $940_R$ sliding on a shaft $942_R$ having a first end $944_R$ and a second end $946_R$. Likewise, the left triangular frame 922 is connected to the first left frame 921 (not shown at FIGS. 24A and 24B) by a spherical joint within a rod-eye $940_L$ sliding on a shaft $942_L$ having a first end $944_L$ and a second end $946_L$. These two joints effectively connect a point at the spherical joint's center to a centerline of the shaft $942$, $942_L$. A cylindrical bore through a ball of the rod-eye $940_L$, $940_R$ slides along a diameter of the shaft $942_R$, $942_L$ as the first framework group 911 transforms between the extended configuration and the retracted configuration. This sliding action is illustrated at FIGS. 24A and 24B. The rod-eye $940_R$, $940_L$ is between the first end $944_R$, $944_L$ and a second end $946_R$, $946_L$ of the shaft $942_R$, $942_L$ when the first framework group 911 is in the extended configuration (FIG. 24A) but moves closer to the second end $946_R$, 9461 of the shaft $942_R$, 942L when the first framework group 911 is in the retracted configuration (FIG. 24B).

The coordinating link 936 effectively adds a symmetric constraint to the first framework group 911. The symmetric constraint keeps movement within the first framework group 911 symmetric from right to left. The symmetric constraint counters the extra degrees of freedom introduced by the fourth left frame 931 and the fourth right frame 933. The previous embodiments included three corresponding panels (instead of four) and thus did not require the symmetric constraint. By including the symmetric constraint along with other features described above and illustrated in the figures, the seventh embodiment of the present disclosure also moves between the extended configuration and the refracted configuration defined by a single variable.

Providing four left frames 921, 926, 929, 931 and four right frames 925, 927, 930, 933 in addition to other features of the seventh embodiment provides other desirable benefits for certain embodiments of the present disclosure. These include the framework groups 911, 912, and 913 producing no movement beyond the flexible covering while transitioning between the extended configuration and the refracted configuration. Thus no interference exists between the flexible covering and the framework groups 911, 912, and 913 in any configuration. The lack of interference allows a flexible covering that flexes but resists stretching. The use of four left frames 921, 926, 929, 931 and four right frames 925, 927, 930, 933 also provides a benefit of nesting frame pairs. In particular, when in the retracted configuration, the second left frame 926 nests within the first left frame 921, the second right frame 927 nests within the first right frame 925, the fourth left frame 931 nests within the third left frame 929, and the fourth right frame 933 nests within the third right frame 930.

Certain beneficial features in certain embodiments of the present disclosure include the gently sloping exterior surfaces of the apparatus when extended, the compact space it occupies when retracted, the relative simplicity of the design, the ability to use simple and low cost components, the ability to control all panels within a panel group with one variable, and the ability to control all the panels within an apparatus or pair of apparatuses with one variable.

It is desirable for drag reducing devices in accordance with the principles of the present disclosure to be shaped to reduce the effects of air flow separation. In certain example embodiments, drag reducing devices in accordance with the principles of the present disclosure may define angles α, β, and γ (see FIGS. 1G and 1J) relative to the rear surface of the vehicle that is less than 18 degrees, or in the range of 10 to 18 degrees. In other embodiments, the angles α, β, and γ are between 8 and 15 degrees. In still other embodiments, the angles α, β, and γ are between 0 and 18 degrees.

Figure 1F:
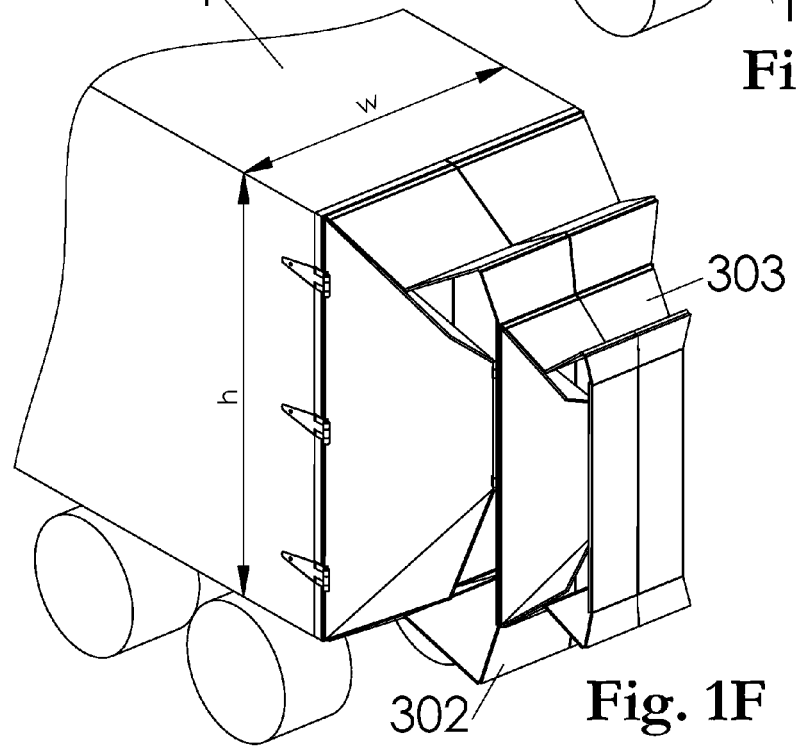
Figure 1G:
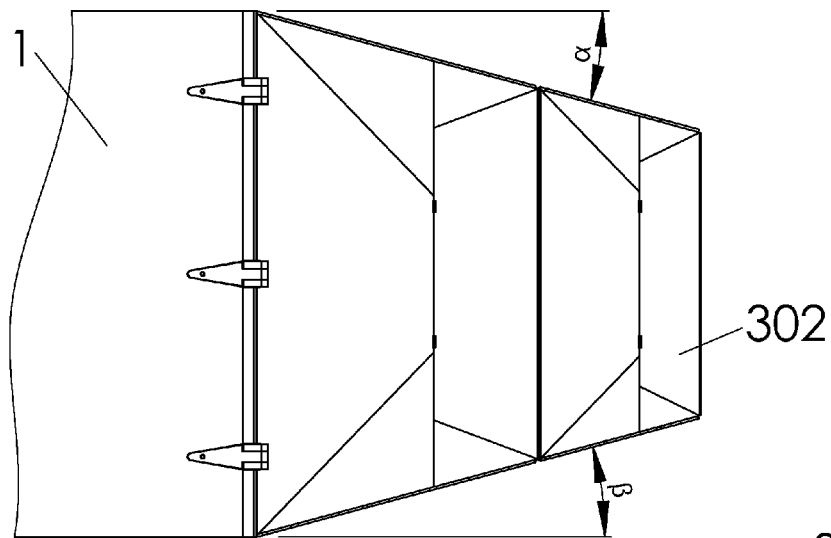
Figure 1H:
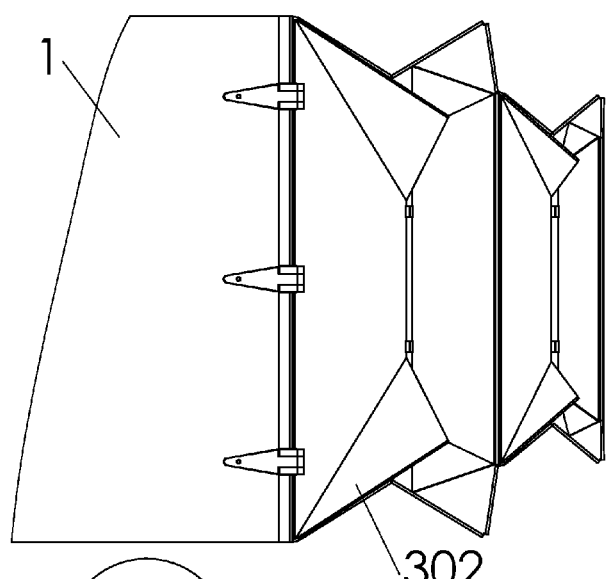
Figure 1I:
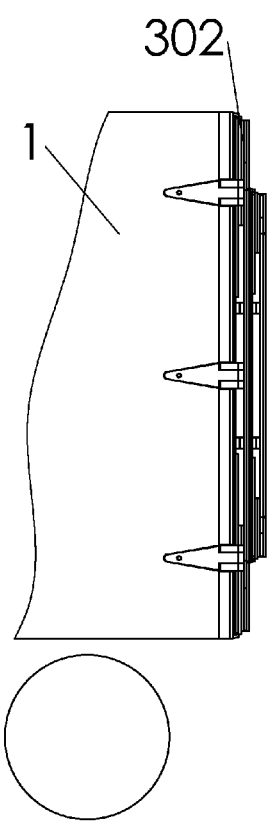
Figure 1J:
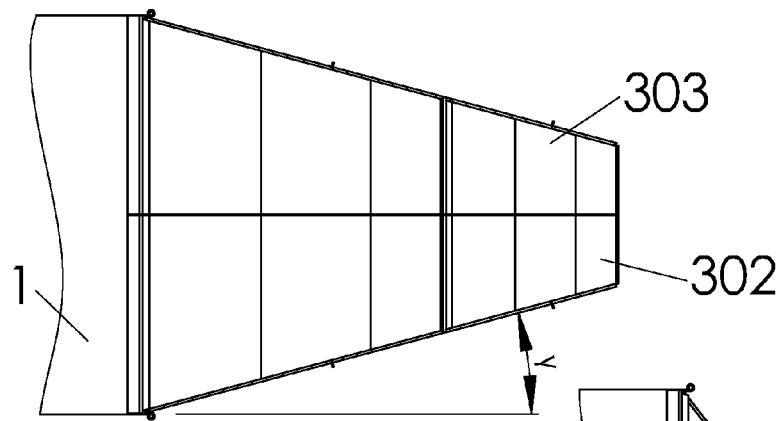
Figure 1K:
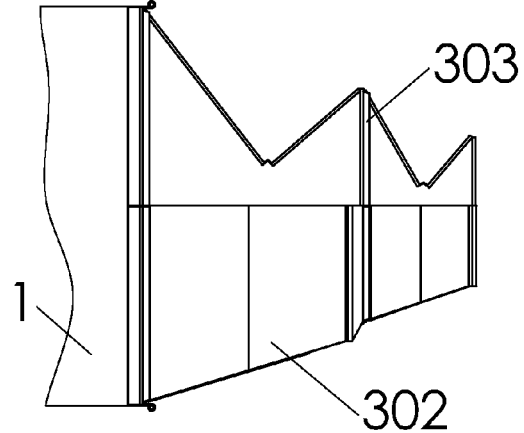
Figure 1L:
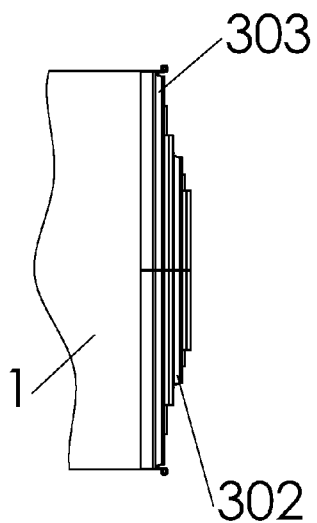
Figure 1M:
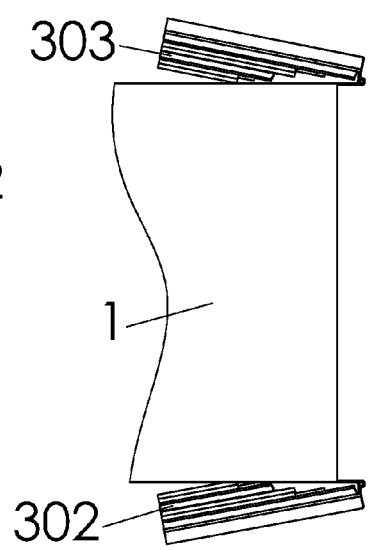
Figure 2A:
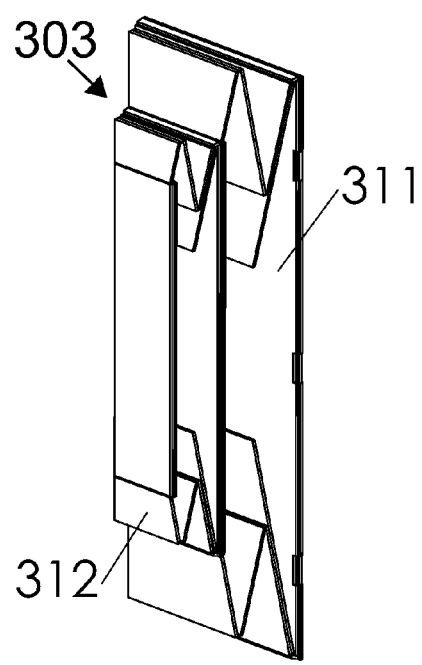
FIGS. 2A through 2D are all perspective views showing the right apparatus half of FIGS. 1A through 1M by itself in various configurations. In this embodiment of the present disclosure, two panel groups are shown. The larger group is attached to the right door of the trailer on its large end, and the smaller group is attached to a rear panel of the larger group (that is the panel farthest from the trailer door). In particular.
Figure 2B:
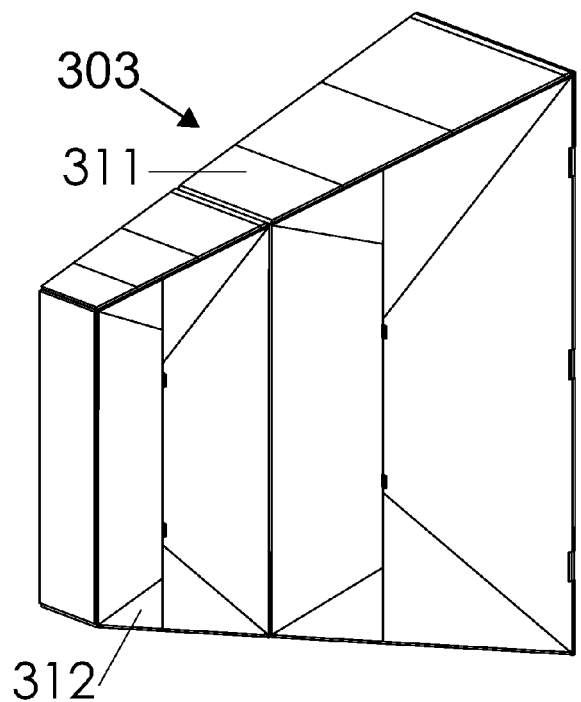
Figure 2C:
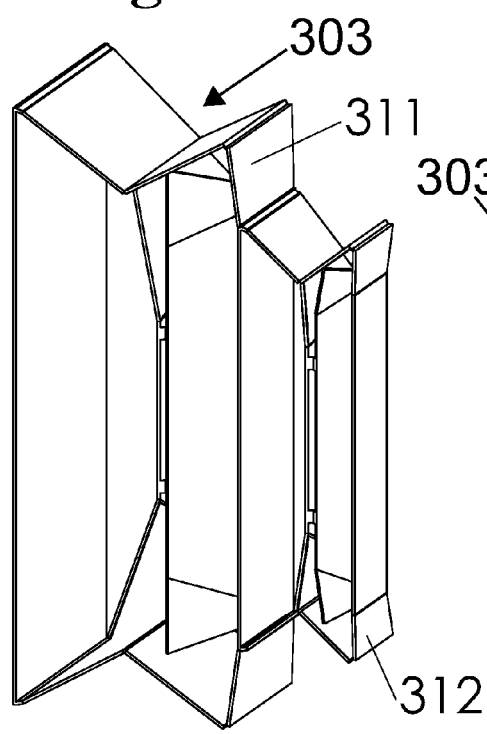
Figure 2D:
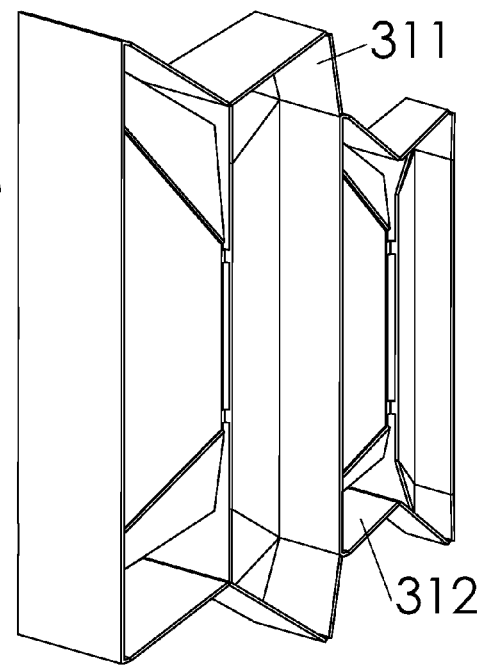
Figure 4A:
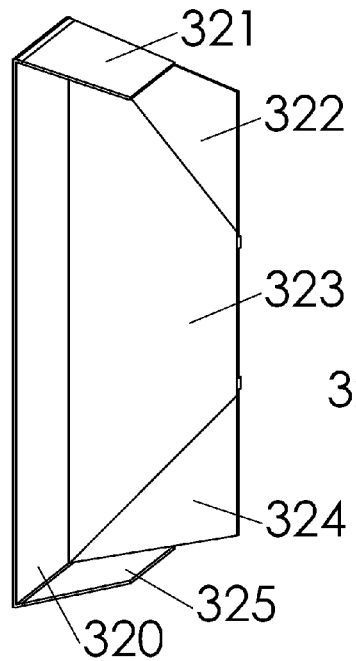
FIGS. 4A through 4F are all perspective views of the same scale, showing several panels of the panel group of FIGS. 3A and 3D. Panels that are not near the large end of the panel group have been removed for the purpose of illustration. In particular.
Figure 4B:
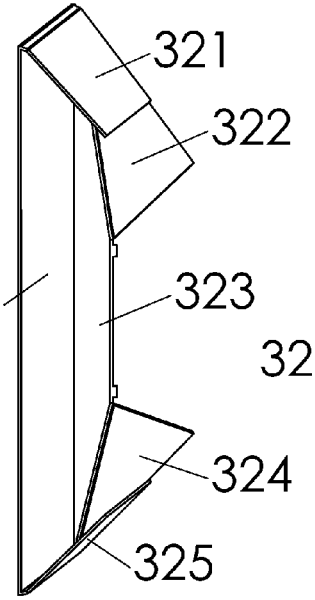
Figure 4C:
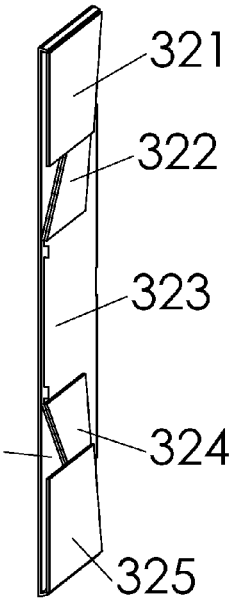
Figure 4D:
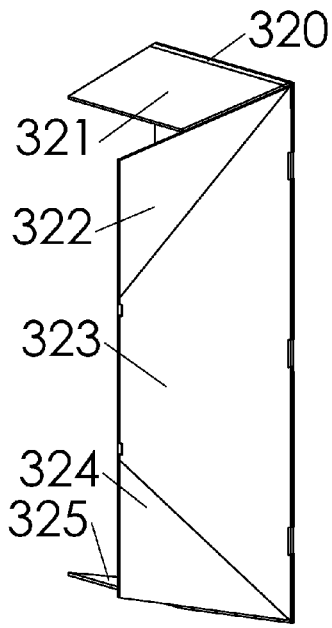
Figure 4E:
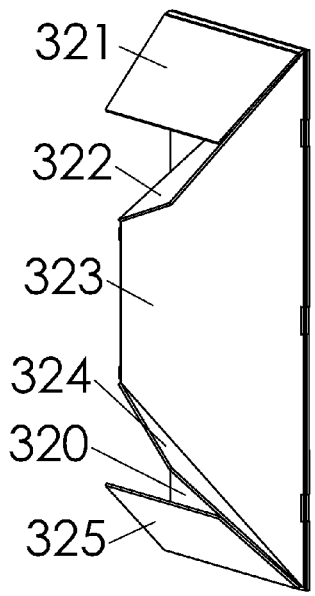
Figure 4F:
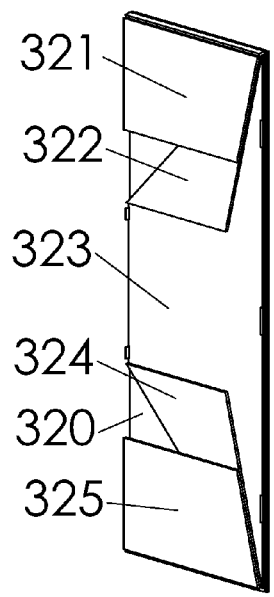
Figure 5A:
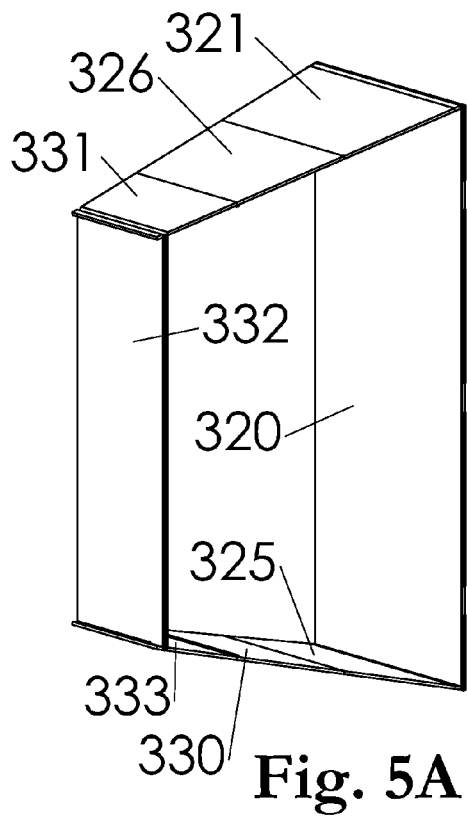
FIGS. 5A through 5D are all perspective views of the same scale as FIGS. 4A through 4F, showing several panels of the panel group of FIGS. 3A and 3D. Side panels have been removed for the purpose of illustration. In particular.
Figure 5B:
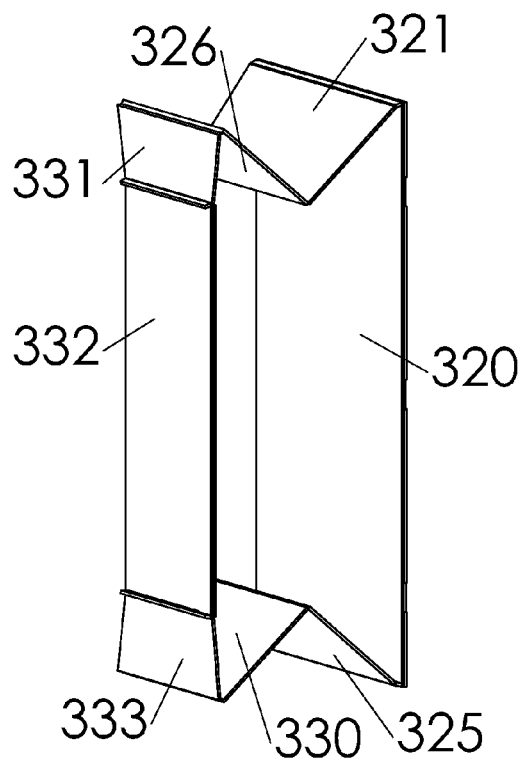
Figure 5C:
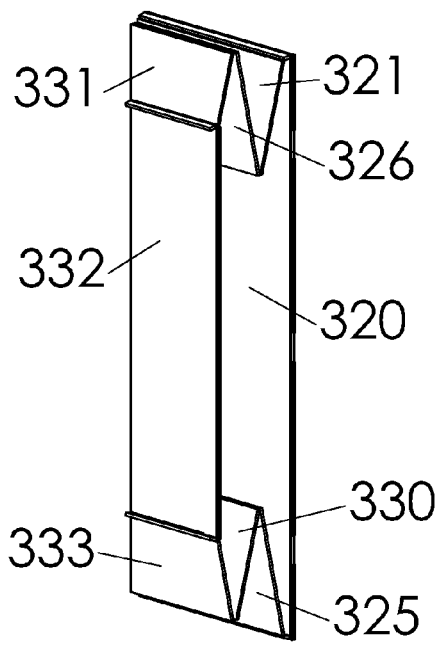
Figure 5D:
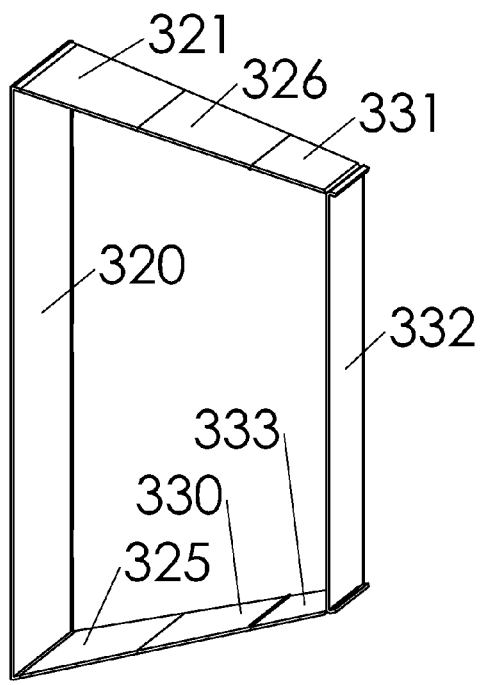
Figure 8A:
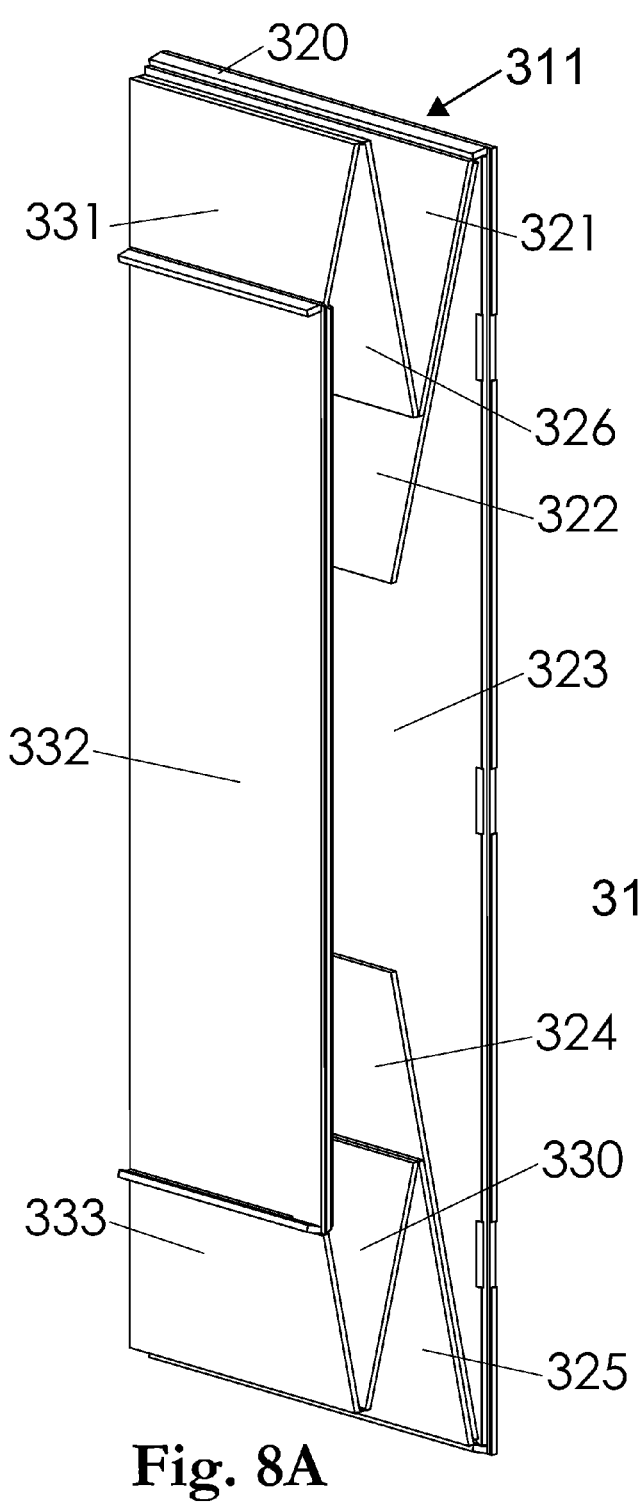
FIGS. 8A and 8B are enlarged views of the same scale, showing the panel group of FIGS. 3A and 3D in the fully retracted configuration. In particular.
Figure 8B:
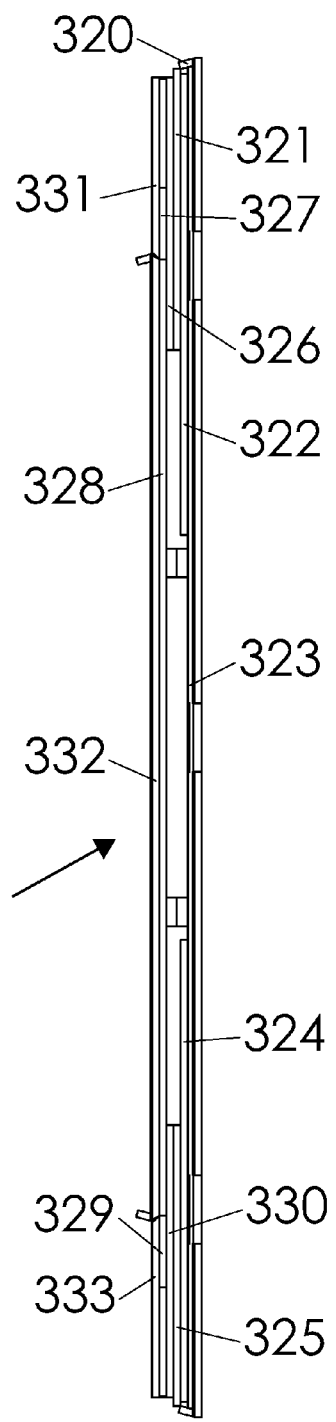

When extended, drag reducing devices in accordance with the present disclosure are typically truncated (see FIG. 1A). In certain truncated embodiments, the extended lengths of the drag reducing devices are such that the effects of drag caused by air flow separation at the truncated ends are minimal. In example embodiments suitable for tractor trailers, the drag reducing devices may have extended lengths greater than 4 feet, or in the range of 6 to 22 feet, or in the range of 8-14 feet. Vehicles having smaller heights and widths could be equipped with proportionally smaller drag reduction devices. In certain embodiments, the ratio of the extended length of the drag reduction device to a reference dimension of the vehicle is at least 1 to 1. The reference dimension is typically the smaller of the width or the height of the rear of the vehicle body. In the embodiment of FIG. 1F, the width w is the reference dimension since it is smaller than the height h. In other embodiments, this ratio is at least 1.5 to 1, or at least 2 to 1, or at least 3 to 1.

In certain embodiments, drag reducing devices in accordance with the present disclosure may be automatically extended and/or retracted. A control system may be used to automatically control extension and refraction. In certain embodiments, vehicle speed, crosswind speed, or other vehicle parameters may be used to automatically control retraction/extension. For example, a controller may sense vehicle speed, and automatically cause refraction of the drag reducing device if the vehicle speed moves below a given speed value (e.g., 45 miles per hour). In another example, a controller may sense crosswind speed, and automatically cause refraction if crosswinds exceed a given value (e.g., 25 miles per hour).

In many embodiments of the present disclosure, the trailer 1, with rear doors, is used as a representative vehicle. Other vehicles exist, such as a truck with a van body, which have similar rear doors. Where appropriate, the discussions involving the trailer 1 and/or the trailer doors apply equally to other vehicles.

Retractable drag reducing devices in accordance with the present disclosure can have relatively long extended lengths as compared to refracted lengths. Certain embodiments have an extended length to refracted length ratio of at least 6 to 1. Other embodiments have extended length to refracted length ratios of at least 10 to 1 or at least 20 to 1.

While specific angles and lengths have been specified for certain embodiments of the present disclosure, it will be appreciated that the broad aspects of the present disclosure are not limited to these values.

In the present disclosure, the words "a" or "an" are to be taken to include both the singular and the plural. Conversely, any references to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred.

What is claimed is:

1. A drag reducing apparatus for reducing drag on a vehicle with a substantially vertical rear end portion, the drag reducing apparatus positioned adjacent the substantially vertical rear end portion of the vehicle, the drag reducing apparatus comprising:
   an upper panel;
   a lower panel, the upper panel positioned above the lower panel;
   a first connecting structure between the upper panel and the lower panel, the first connecting structure comprising:
     a first member hingedly mounted to the substantially vertical rear end portion of the vehicle;
     a second member pivotally connected to the first member and connected to the upper panel at a first joint; and
     a third member pivotally connected to the first member and connected to the lower panel at a second joint;
   wherein the upper panel and the lower panel are moveable from a stowed position on the substantially vertical rear end portion to a deployed position in which the upper panel and the lower panel define at least a portion of an aerodynamic structure with a rearwardly opening cavity; and
   wherein moving the upper panel and the lower panel is coordinated with the first connecting structure.

2. The drag reducing apparatus of claim 1, wherein the upper panel and the lower panel are moveable from the deployed position inwardly and toward each other to the stowed position.

3. The drag reducing apparatus of claim 1, wherein the upper panel and the lower panel are moveable from the stowed position to the deployed position outwardly and away from each other.

4. The drag reducing apparatus of claim 1, wherein the upper panel and the lower panel are each oriented substantially vertically when the upper panel and the lower panel are in the stowed position.

5. The drag reducing apparatus of claim 1, wherein the substantially vertical rear end portion of the vehicle includes at least one door of the vehicle.

6. The drag reducing apparatus of claim 1, further comprising a second connecting structure between the upper panel and the lower panel, the second connecting structure comprising:
   a fourth member hingedly mounted to the substantially vertical rear end portion of the vehicle;
   a fifth member pivotally connected to the fourth member and connected to the upper panel at a third joint; and
   a sixth member pivotally connected to the fourth member and connected to the lower panel at a fourth joint.

7. The drag reducing apparatus of claim 6, wherein the fourth member is a side panel, the fifth member is a first connecting panel, and the sixth member is a second connecting panel.

8. The drag reducing apparatus of claim 7, wherein the first and the second connecting panels are each a triangular panel.

9. The drag reducing apparatus of claim 1, wherein the first member is a side panel and the second member is a connecting panel.

10. The drag reducing apparatus of claim 9, wherein the connecting panel is a triangular panel.

11. The drag reducing apparatus of claim 9, wherein the connecting panel is oriented substantially vertically when the upper panel and the lower panel are in the deployed position and when the upper panel and the lower panel are in the stowed position.

12. The drag reducing apparatus of claim 11, wherein the side panel and the connecting panel are each oriented at an inward slope as each of the side panel and the connecting panel extends rearwardly from the substantially vertical rear end portion of the vehicle when the upper panel and the lower panel are in the deployed position.

13. The drag reducing apparatus of claim 9, wherein the connecting panel and the upper panel are each oriented at a downward slope as each of the connecting panel and the upper panel extends rearwardly from the substantially vertical rear end portion of the vehicle when the upper panel and the lower panel are in the deployed position.

14. The drag reducing apparatus of claim 13, wherein each of the downward slopes defines an angle in a range between 10 degrees and 18 degrees from a horizontal plane.

15. The drag reducing apparatus of claim 13, wherein each of the downward slopes defines an angle in a range between 8 degrees and 15 degrees from a horizontal plane.

16. The drag reducing apparatus of claim 14, wherein the side panel is oriented at an inward slope as the side panel extends rearwardly from the substantially vertical rear end portion of the vehicle when the upper panel and the lower panel are in the deployed position and wherein the inward slope defines an angle in a range between 10 degrees and 18 degrees from a side of the vehicle.

17. A drag reducing apparatus for reducing drag on a vehicle with a substantially vertical rear end portion, the drag reducing apparatus positioned adjacent the substantially vertical rear end portion of the vehicle, the drag reducing apparatus comprising:
an upper panel assembly;
a lower panel assembly;
a first intermediate panel assembly engaged with the upper panel assembly and the lower panel assembly, the intermediate panel assembly comprising:
a first side panel hingedly engaged with the substantially vertical rear end portion of the vehicle;
a first triangular panel engaged with the first side panel and the upper panel assembly; and
a second triangular panel engaged with the first side panel and the lower panel assembly;
wherein the upper panel assembly and the lower panel assembly are moveable from a stowed position on the substantially vertical rear end portion to a deployed position in which the upper panel and the lower panel define at least a portion of an aerodynamic structure with a rearwardly opening cavity;
wherein moving the upper panel assembly and the lower panel assembly is coordinated with the intermediate panel assembly.

18. The drag reducing apparatus of claim 17, wherein:
the upper panel assembly comprises a left upper panel and a right upper panel; and
the lower panel assembly comprises a right lower panel and a left lower panel.

19. The drag reducing apparatus of claim 17, further comprising:
a second intermediate panel assembly between the upper panel assembly and the lower panel assembly, the intermediate panel assembly comprising:
a second side panel hingedly engaged with the substantially vertical rear end portion of the vehicle;
a third triangular panel engaged with the second side panel and the upper panel assembly; and
a fourth triangular panel engaged with the second side panel and the lower panel assembly.

* * * * *